(12) United States Patent
Otani et al.

(10) Patent No.: US 11,020,985 B2
(45) Date of Patent: Jun. 1, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Ryosuke Otani, Tokyo (JP); Tomoya Kiriyama, Utsunomiya (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/752,045

(22) Filed: Jan. 24, 2020

(65) Prior Publication Data

US 2020/0247137 A1    Aug. 6, 2020

(30) Foreign Application Priority Data

Jan. 31, 2019   (JP) .............................. JP2019-015879
Nov. 27, 2019   (JP) .............................. JP2019-214292

(51) Int. Cl.
*B41J 2/21*   (2006.01)
*B41J 2/045*   (2006.01)

(52) U.S. Cl.
CPC ......... *B41J 2/2135* (2013.01); *B41J 2/04593* (2013.01); *B41J 2/2121* (2013.01)

(58) Field of Classification Search
CPC ............... B41J 2/04525; B41J 2/04535; B41J 2/04551; B41J 2/04573; B41J 2/04526; B41J 2/0456; B41J 2/04558; B41J 2/04561; B41J 2/04583; B41J 2/04588; B41J 2/0459; B41J 2/04591; B41J 2/04593; B41J 2/04595

See application file for complete search history.

(56) References Cited

U.S. PATENT DOCUMENTS 9,201,839 B2   12/2015   Hara et al.
9,462,091 B2   10/2016   Hara et al.
(Continued)

FOREIGN PATENT DOCUMENTS

JP   2004058284 A   2/2004

OTHER PUBLICATIONS

Extended European Search Report issued by the European Patent Office dated Jul. 3, 2020 in corresponding EP Patent Application No. 20154308.9.

*Primary Examiner* — Kristal Feggins
(74) *Attorney, Agent, or Firm* — Carter, DeLuca & Farrell LLP

(57) ABSTRACT

The image processing apparatus includes: an acquisition unit configured to acquire a pixel value group consisting of pixel values of a plurality of pixels included in a predetermined target area in image data; an acquisition unit configured to acquire a threshold value group consisting of a plurality of threshold values corresponding to the plurality of pixels; a calculation unit configured to calculate a target number of dots indicating a number of dots to be arranged within the target area; an acquisition unit configured to acquire a pixel position at which a dot is expected to be formed by a non-ejectable nozzle in the image data as a non-ejectable nozzle position; and determination unit configured to determine arrangement of dots in the target area based on a priority level determined based on the pixel value group and the threshold value group, the target number of dots, and the non-ejectable nozzle position.

21 Claims, 30 Drawing Sheets

(56) References Cited

U.S. PATENT DOCUMENTS

| | | |
|---|---|---|
| 9,463,638 B1 | 10/2016 | Kroon |
| 9,485,388 B2 | 11/2016 | Kodama et al. |
| 9,690,228 B2 | 6/2017 | Otani |
| 9,734,439 B2 | 8/2017 | Hara et al. |
| 9,749,496 B2 | 8/2017 | Fujimoto et al. |
| 10,027,848 B2 | 7/2018 | Fuse et al. |
| 10,043,118 B2 | 8/2018 | Sumi et al. |
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 10,187,553 B2 | 1/2019 | Takesue et al. |
| 10,194,053 B2 | 1/2019 | Otani et al. |
| 10,356,282 B2 | 7/2019 | Ochiai et al. |
| 10,545,446 B2 | 1/2020 | Takikawa et al. |
| 2006/0170937 A1 | 8/2006 | Takahashi |
| 2015/0286908 A1 | 10/2015 | Shibata |
| 2015/0360491 A1 | 12/2015 | Billow et al. |
| 2019/0156164 A1 | 5/2019 | Yanai et al. |
| 2019/0362202 A1 | 11/2019 | Kikuta et al. |
| 2020/0074251 A1 | 3/2020 | Takesue et al. |
| 2020/0079102 A1 | 3/2020 | Ochiai et al. |
| 2020/0156386 A1 | 5/2020 | Otani et al. |
| 2020/0171820 A1 | 6/2020 | Takesue et al. |
| 2020/0184289 A1 | 6/2020 | Takesue et al. |
| 2020/0198365 A1 | 6/2020 | Ochiai et al. |
| 2020/0204705 A1 | 6/2020 | Hashioka et al. |

| -26 | 113 | 2 | 167 | -80 |
|---|---|---|---|---|
| 211 | -69 | 54 | -188 | 35 |
| -140 | -97 | 197 | -51 | 76 |
| 19 | 87 | -162 | 140 | -123 |

1602

| 0 | 128 | 0 | 128 | 0 |
|---|---|---|---|---|
| 0 | 128 | 0 | 128 | 0 |
| 0 | 128 | 0 | 128 | 0 |
| 0 | 128 | 0 | 128 | 0 |

1603

| -26 | 241 | 2 | 295 | -80 |
|---|---|---|---|---|
| 211 | 59 | 54 | -60 | 35 |
| -140 | 31 | 197 | 77 | 76 |
| 19 | 215 | -162 | 268 | -123 |

1606

| 64 | 128 | 0 | 128 | 64 |
|---|---|---|---|---|
| 64 | 128 | 0 | 128 | 64 |
| 64 | 128 | 0 | 128 | 64 |
| 64 | 128 | 0 | 128 | 64 |

|  | 2901 | | |
|---|---|---|---|
| 32 | 32 | 32 | 32 |
| 32 | 32 | 32 | 32 |
| 32 | 32 | 32 | 32 |
| 32 | 32 | 32 | 32 |

|  | 2902 | | |
|---|---|---|---|
| 24 | -58 | -151 | -80 |
| -168 | -16 | -215 | -37 |
| -24 | -90 | -146 | -69 |
| -216 | -48 | -210 | -26 |

|  | 2903 | | |
|---|---|---|---|
| 1 | 7 | 12 | 9 |
| 13 | 2 | 15 | 5 |
| 3 | 10 | 11 | 8 |
| 16 | 6 | 14 | 4 |

FIG.29

IMAGE PROCESSING APPARATUS, IMAGE PROCESSING METHOD AND STORAGE MEDIUM

BACKGROUND OF THE INVENTION

Field of the Invention

The present disclosure relates to a technique to complement a non-ejectable nozzle.

Description of the Related Art

Conventionally, an ink jet printing apparatus is used that forms a desired image on a printing medium by ejecting ink droplets from each nozzle while relatively moving a print head having a nozzle row in which a plurality of ink ejection ports (nozzles) is arrayed and the printing medium.

In the ink jet printing apparatus, in a case where ink droplets are no longer ejected because of clogging of a nozzle or failure of an element, there is a possibility that streak unevenness occurs in an image formed on a printing medium.

Consequently, in order to make less conspicuous streak unevenness, Japanese Patent Laid-Open No. 2004-58284 has disclosed a non-ejection complementation technique to complement a dot expected to be formed by a non-ejectable nozzle by a nozzle adjacent to the non-ejectable nozzle for a dot pattern.

However, in the technique described in Japanese Patent Laid-Open No. 2004-58284, a simple rule is applied in which a dot is complemented by alternately selecting pixels adjacent to a pixel expected to be formed by a non-ejectable nozzle from left and right. Because of this, there is a possibility that unnatural density unevenness occurs locally.

The present disclosure has been made in view of the above-described problem and an object thereof is to improve reproducibility of input image data while suppressing unnatural density unevenness.

SUMMARY OF THE INVENTION

The image processing apparatus according to the present disclosure is an image processing apparatus that processes image data for forming an image by ejection of ink from a plurality of nozzles and comprises: a pixel value acquisition unit configured to acquire a pixel value group consisting of pixel values of a plurality of pixels included in a predetermined target area in the image data; a threshold value acquisition unit configured to acquire a threshold value group consisting of a plurality of threshold values corresponding to the plurality of pixels; a derivation unit configured to derive a target number of dots indicating a number of dots to be arranged within the target area; a position acquisition unit configured to acquire a pixel position at which a dot is expected to be formed by a non-ejectable nozzle in the image data as a non-ejectable nozzle position; and a dot arrangement determination unit configured to determine arrangement of dots in the target area based on a priority level determined based on the pixel value group and the threshold value group, the target number of dots, and the non-ejectable nozzle position.

Further features of the present invention will become apparent from the following description of exemplary embodiments with reference to the attached drawings.

BRIEF DESCRIPTION OF THE DRAWINGS

FIG. 7 is a diagram showing data used in the processing in the image processing unit and processing results obtained in a process of the processing;

FIG. 16 is a diagram showing data used in the processing in the regeneration unit and processing results obtained in a process of the processing;

FIG. 22 is a diagram showing data used in the processing in the regeneration unit and processing results obtained in a process of the processing;

FIG. 29 is a diagram showing data used in processing in a priority level determination unit and processing results obtained in a process of the processing.

DESCRIPTION OF THE EMBODIMENTS

Hereinafter, with reference to the attached drawings, the present disclosure is explained in detail in accordance with the preferred embodiments. Configurations shown in the following embodiments are merely exemplary and the present disclosure is not limited to the configurations shown schematically.

First Embodiment (Hardware Configuration of Image Forming System)

Figure 1:
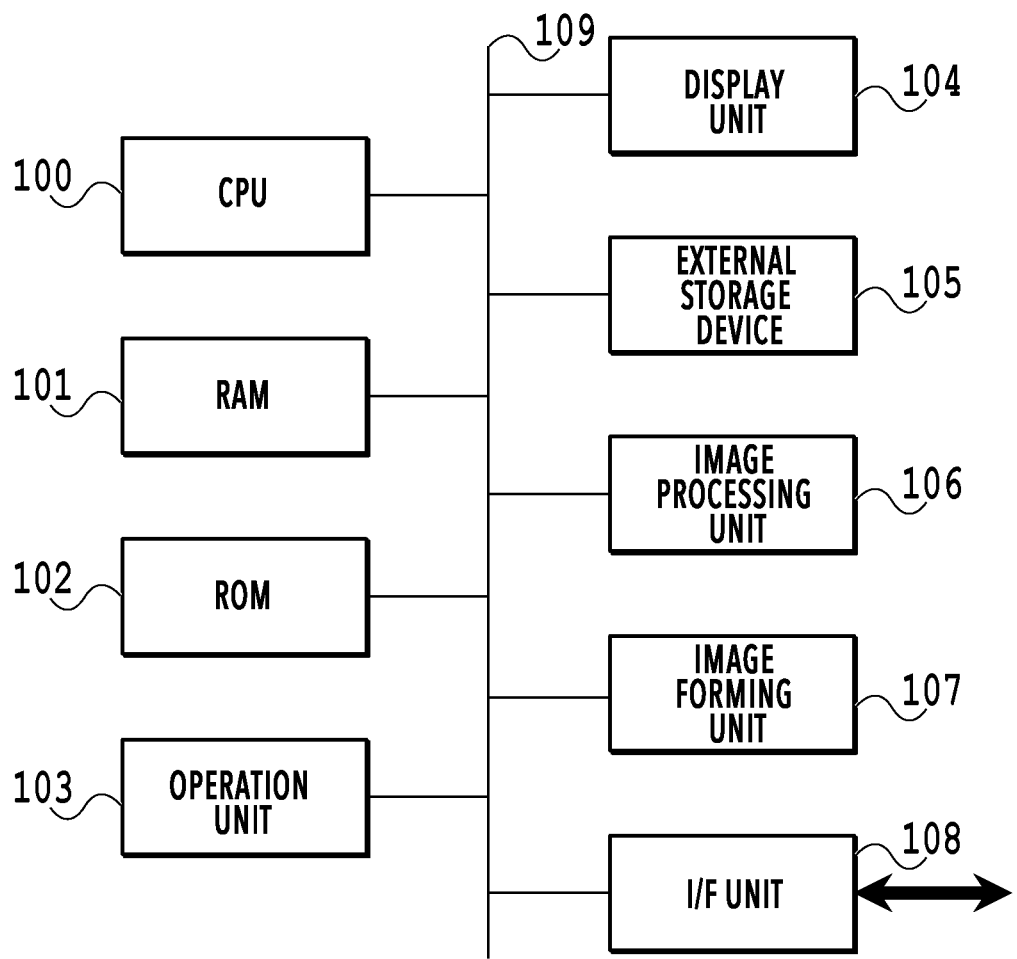
FIG. 1 is a diagram showing a hardware configuration of an image forming system including an image processing apparatus.

FIG. 1 is a diagram showing a hardware configuration of an image forming system including an image processing apparatus according to a first embodiment. In the present embodiment, explanation is given by taking an image processing controller as an example of the image processing apparatus, which is incorporated within the image forming system that forms an image on a printing medium by using printing materials.

The image forming system comprises a CPU 100, a RAM 101, a ROM 102, an operation unit 103, a display unit 104, an external storage device 105, an image processing unit 106, an image forming unit 107, an I/F (interface) unit 108, and a bus 109.

The CPU (Central Processing Unit) 100 controls the operation of the entire image forming system by using input data and computer programs stored in the RAM and the ROM, to be described later. Here, explanation is given by taking a case as an example thereof where the CPU 100 controls the entire image forming system, but it may also be possible to control the entire image forming system by dividing the processing among a plurality of pieces of hardware.

The RAM (Random Access Memory) 101 temporarily stores computer programs and data read from the external storage device 105 and data received from the outside via the I/F unit 108. Further, the RAM 101 is used as a storage area used in a case where the CPU 100 performs various kinds of processing and as a storage area in a case where the image processing unit 106 performs image processing. That is, it is possible for the RAM 101 to appropriately provide various storage areas. The ROM (Read Only Memory) 102 stores setting parameters that are set to each unit in the image forming system, a boot program, and the like.

The operation unit 103 is an input device, such as a keyboard and a mouse, and receives operations (instructions) by an operator. That is, it is possible for an operator to input various instructions to the CPU 100 via the operation unit 103. The display unit 104 is a display device, such as a CRT (Cathode Ray Tube) and an LCD (Liquid Crystal Display), and capable of displaying processing results by the CPU 100 by images, characters, and the like. In a case where the display unit 104 is a touch panel capable of detecting a touch operation, the display unit 104 may function as a part of the operation unit 103.

The external storage device 105 is a large-capacity information storage device represented by a hard disk drive. In the external storage device 105, an OS (Operating System), computer programs, data, and the like for causing the CPU 100 to perform various kinds of processing are saved. Further, the external storage device 105 stores temporary data (for example, image data that is input and output, threshold value matrix used in the image processing unit 106, position of a non-ejectable nozzle not capable of ejecting ink, and the like) generated by the processing of each unit. The computer programs and data stored in the external storage device 105 are read appropriately in accordance with the control by the CPU 100 and stored in the RAM 101, and thus becomes the processing target by the CPU 100.

The image processing unit 106 is implemented as a processor capable of executing computer programs or a dedicated image processing circuit and performs various kinds of image processing in order to convert image data that is input as the print target into image data that can be output by the image forming unit 107. For example, upon receipt of instructions to perform image processing from the CPU 100, the image processing unit 106 performs quantization processing for the digital image data of N tones (N: natural number), which is input from the external storage device 105, and outputs image data after being quantized into M tones (M: natural number, N>M).

The image forming unit 107 forms an image on a printing medium by using printing materials based on the output image data received from the image processing unit 106. It is assumed that the image forming unit 107 adopts the ink jet method of forming an image by ejecting ink onto a printing medium from nozzles.

The I/F unit 108 functions as an interface for connecting the image forming system and external devices. Further, the I/F unit 108 also functions as an interface for performing transmission and reception of data with the communication device by using infrared communication, a wireless LAN (Local Area Network), or the like, and an interface for connecting to the internet. Each unit described above is connected to the bus 109 and it is possible for each unit to perform transmission and reception of data via the bus 109.

(Function Configuration of Image Processing Unit 106)

Figure 2:
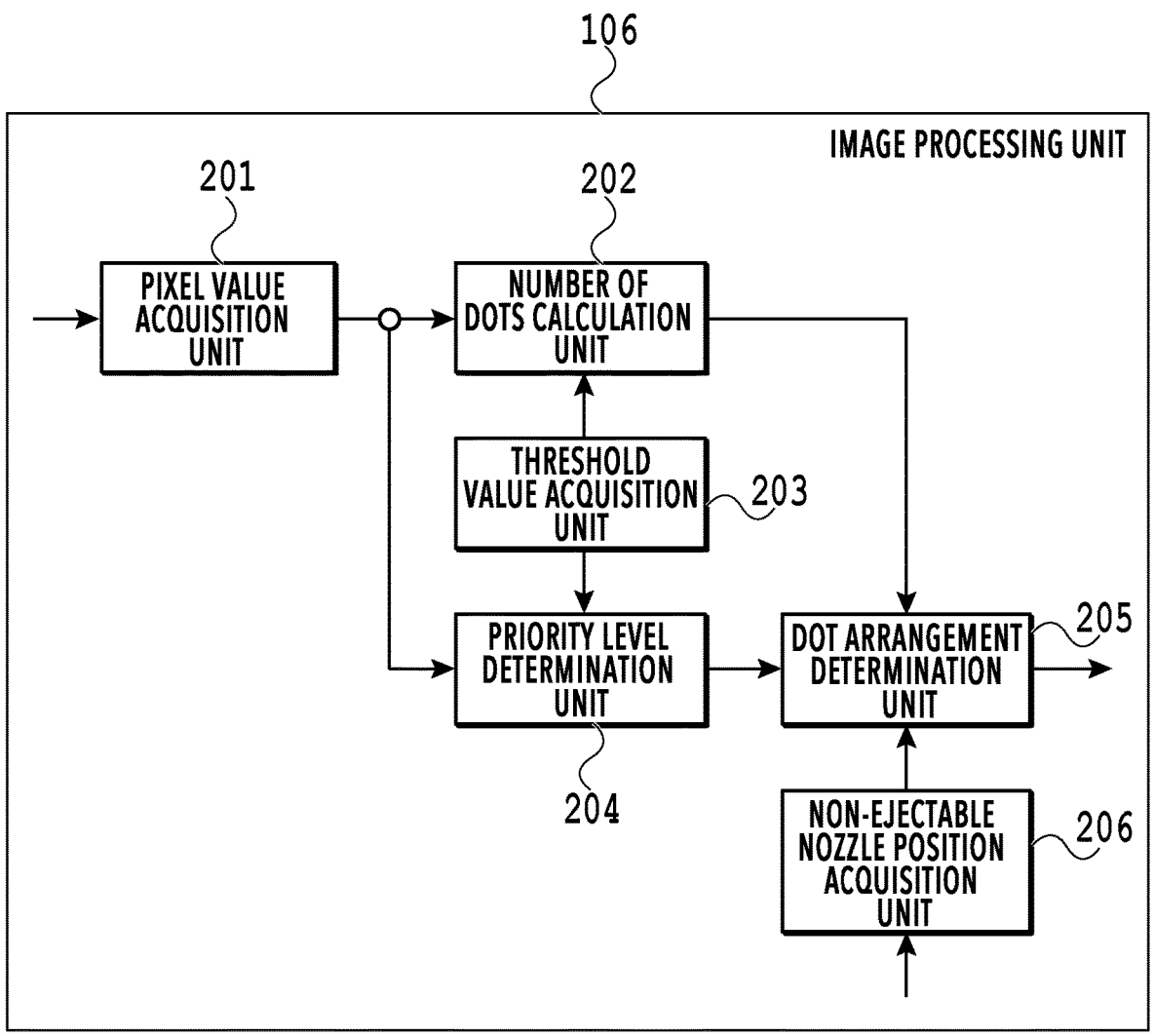
FIG. 2 is diagram showing a function configuration of an image processing unit.

Next, by using FIG. 2, the function configuration of the image processing unit 106 is explained. The image processing unit 106 performs quantization processing (halftone processing) to convert digital image data (hereinafter, referred to as "input image data") that is input to the image processing unit 106 into halftone image data whose number of tones is smaller than the number of tones of the input image data.

In the following, the halftone processing is explained supplementally. The input image data is 8-bit image data indicating a value of one of "0" to "255" for each pixel (that is, multi-valued image data before halftone processing). The image processing unit 106 converts the input image data having eight bits per pixel into 1-bit binary halftone image data (hereinafter, referred to as "output image data") having a value of "0" or "1" for each pixel. In the halftone image data, the pixel whose pixel value (output value) is "0" indicates off of a dot and the pixel whose pixel value is "1" indicates on of a dot. Then, it can be said that the halftone image data such as this reproduces the input image data in a pseudo manner with the number of tones smaller than the number of tones of the input image data as described above.

As shown in FIG. 2, the image processing unit 106 has a pixel value acquisition unit 201, a number of dots calculation unit 202, a threshold value acquisition unit 203, a priority level determination unit 204, a dot arrangement determination unit 205, and a non-ejectable nozzle position acquisition unit 206. The image processing unit 106 is implemented as a dedicated image processing circuit configuring the block diagram shown in FIG. 2.

Figure 3:
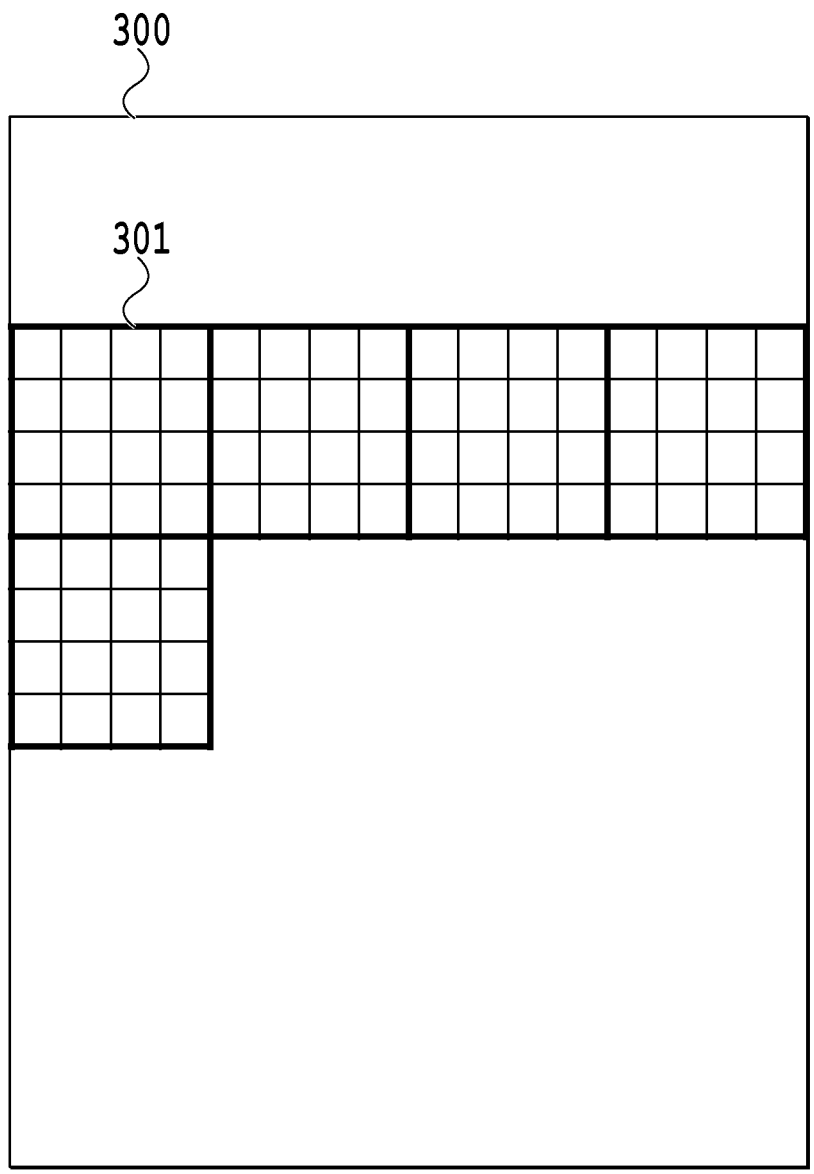
FIG. 3 is a diagram illustrating input image data.

The pixel value acquisition unit 201 acquires the pixel value for each of a plurality of pixels included in the unit area (hereinafter, referred to as "target area") that is the processing target in the input image data. Here, FIG. 3 is a diagram illustrating input image data 300. In FIG. 3, the area of four vertical pixels and four horizontal pixels indicated by a thick frame is shown as the unit area. In this case, the pixel value acquisition unit 201 acquires the pixel value of each of the 16 pixels included in a unit area 301 provided that the unit area 301 is taken as the target area.

The number of dots calculation unit 202 calculates the number of dots (hereinafter, referred to as "target number of dots") that should be arranged within the target area based on the pixel value (pixel value group) of each pixel configuring the target area and the threshold value group corresponding to the target area. That is, the number of dots calculation unit 202 functions as an example of a derivation unit. In the present embodiment, it is assumed that in a case where the pixel value is larger than a threshold value, the quantized value is taken to be "1", indicating on of a dot and in a case where the pixel value is less than or equal to the threshold value, the quantized value is taken to be "0", indicating off of a dot. Then, the number of dots calculation unit 202 compares the average pixel value of all the pixels included in the target area with the threshold value of the threshold value group corresponding to the target area and determines the number of threshold values that are less than the average pixel value as the target number of dots. That is, the target number of dots in the target area corresponds to the number of pixels whose quantized value is "1" in the target area.

Figure 4:
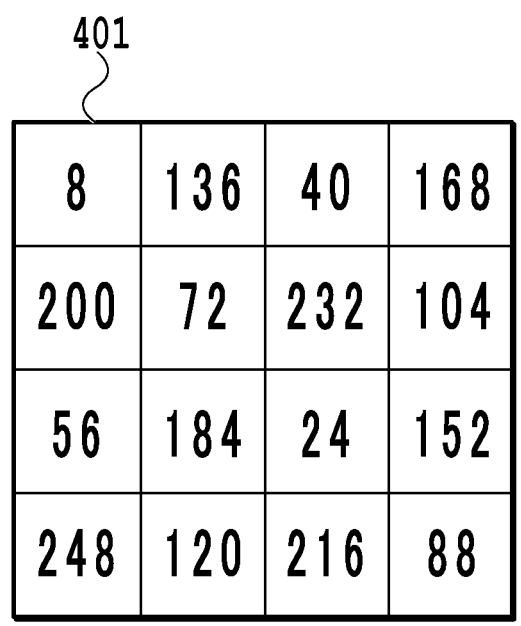
FIG. 4 is a diagram illustrating a threshold value group.

The threshold value acquisition unit 203 acquires the threshold value group (threshold value matrix) used in the dither processing from the RAM 101 or the external storage device 105. In the present embodiment, it is assumed that a threshold value group 401 shown in FIG. 4 is used. As shown in FIG. 4, in the threshold value group 401, threshold values whose values are different are arranged in the form of a matrix so as to correspond to each pixel within the target area. By repeatedly applying the threshold value group such as this to the entire input image in a tiling manner, comparison processing with a threshold value is performed for all the pixels within the input image. The threshold value acquisition unit 203 acquires the threshold value group 401 each time the target area is read anew because the target area and the threshold value group has the same size (that is, four vertical pixels, four horizontal pixels).

The priority level determination unit 204 determines a priority level of a dot in the target area based on the pixel value of each pixel included in the acquired target area, which is acquired from the pixel value acquisition unit 201, and the threshold value of the threshold value group, which is acquired from the threshold value acquisition unit 203. Specifically, the corresponding threshold value in the threshold value group is subtracted from the pixel value of each pixel included in the target area and the obtained value (difference) is set as a priority level. That is, at the time of performing subtraction, it is assumed that the threshold value that corresponds to the pixel position in the target area in terms of position in the threshold value group is used. Further, it is assumed that the larger the value (that is, subtraction result) is, the higher the priority level is.

The dot arrangement determination unit 205 arranges dots by allocating "1" as the output value in order from the pixel whose priority level determined by the priority level determination unit 204 is the highest. The dot arrangement determination unit 205 determines the output value of each pixel in the target area by repeatedly performing the processing to arrange a dot in accordance with the target number of dots calculated by the number of dots calculation unit 202. In a case where the pixel that is the dot-arrangement target is the pixel located at the non-ejectable nozzle position acquired by the non-ejectable nozzle position acquisition unit 206, the dot arrangement determination unit 205 leaves the pixel value (output value) of the pixel as "0" and does not arrange a dot.

The non-ejectable nozzle position acquisition unit 206 acquires the non-ejectable position from the RAM 101 or the external storage device 105. Here, the non-ejectable nozzle position is information indicating to which pixel column of the input image, the non-ejectable nozzle corresponds, which is not capable of ejecting ink because of clogging of the nozzle, failure of an element, and the like. By this non-ejectable nozzle position, the pixel column in which dots cannot be formed by the image forming unit 107 is made clear. The non-ejectable nozzle position is obtained in advance by a publicly known method. As the publicly known method, for example, there is a method of specifying the position of a nozzle not capable of ejecting ink by outputting in advance the chart for non-ejection position detection and analyzing the output (formed) image.

Figure 5:
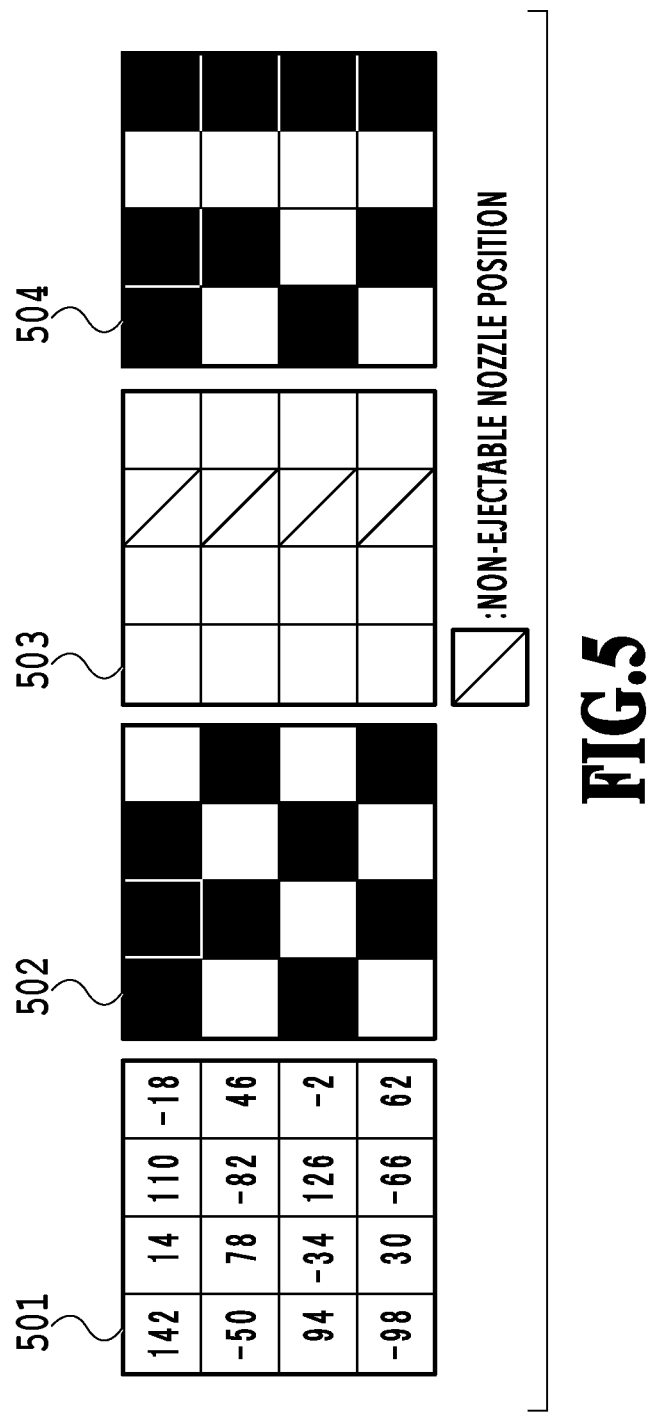
FIG. 5 is a diagram showing arrangement of dots arranged by a dot arrangement determination unit.

As a supplement, the dot arrangement performed by the dot arrangement determination unit 205 is explained with reference to FIG. 5. Here, a case is supposed where the target number of dots "9" is acquired as the input from the number of dots calculation unit 202 and priority levels 501 are acquired as the input from the priority level determination unit 204. In a case where dots are arranged in accordance with the supposition, output results 502 are obtained. In the output results 502, a black-painted square indicates a pixel in which a dot is arranged and a white-painted square indicates a pixel in which no dot is arranged.

In this case, on a condition that the pixel position indicated by a slash in an area 503 corresponds to a non-ejectable nozzle, it is not possible to form a dot at the pixel position on a printing medium. Consequently, the dot arrangement determination unit 205 does not arrange a dot at the pixel position indicated by the non-ejectable nozzle position but instead, makes determination so that a dot is arranged at the pixel position whose priority level is high except for the pixel position indicated by the non-ejectable nozzle position. Due to this, output results 504 are obtained. In the output results 504, dots corresponding to the target number of dots, which can be formed on a printing medium, are arranged.

(Processing Procedure in Image Processing Unit 106)

Figure 6:
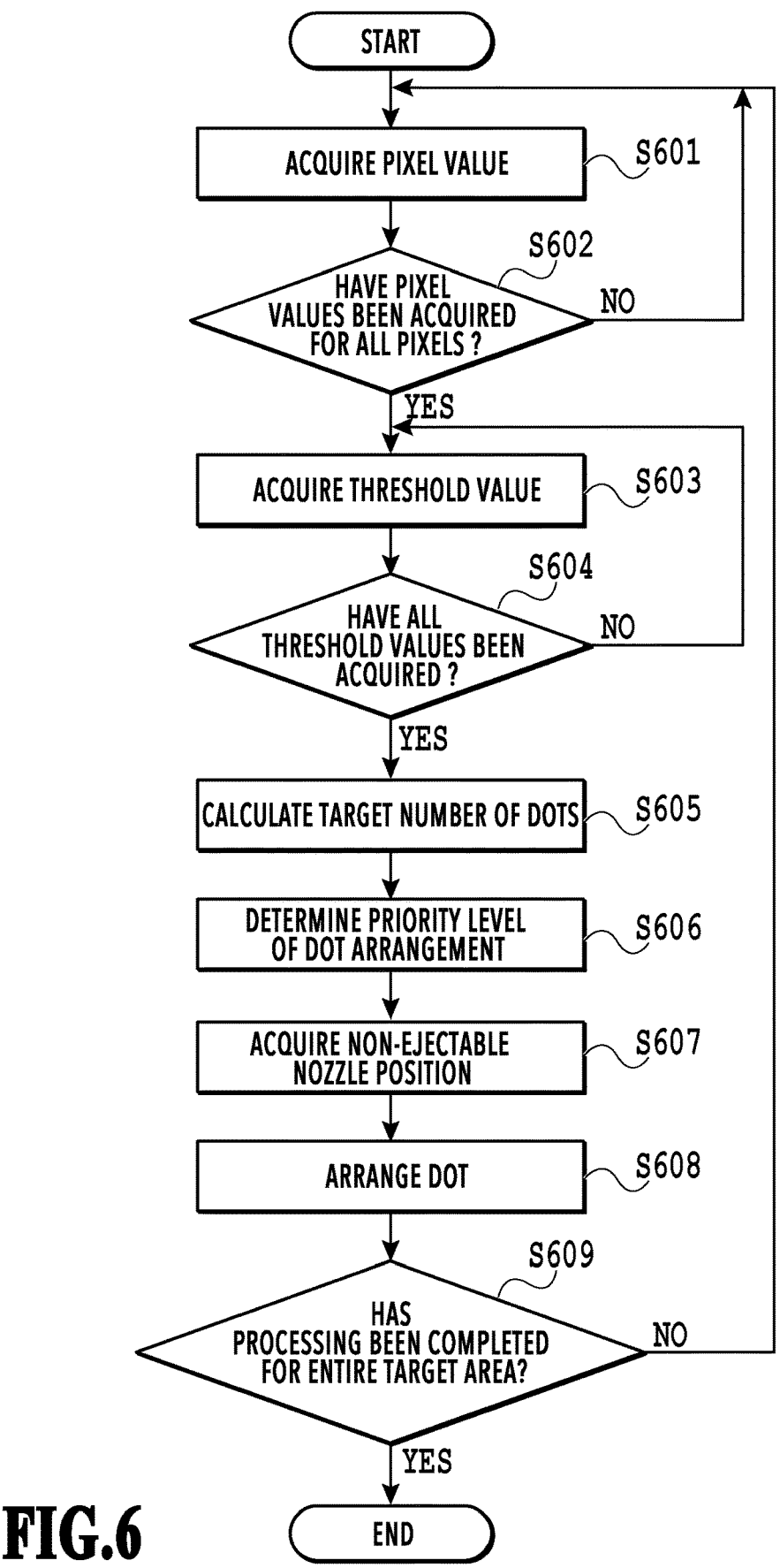
FIG. 6 is a diagram showing a procedure of processing in the image processing unit.

Next, by using the flowchart in FIG. 6, the procedure of the processing in the image processing unit 106 is explained. Further, FIG. 7 shows data used in the processing shown in FIG. 6 and processing results obtained in a process of the processing. Symbol "S" in explanation of the flowchart represents a step. This is also the same in explanation of subsequent flowcharts.

At S601, the pixel value acquisition unit 201 acquires the pixel value for one pixel among the plurality of pixels included in the target area in the input image data. In FIG. 7, for example, by taking an area 701 as the target area, the pixel value is acquired for one pixel among 16 pixels included in the target area.

At S602, the pixel value acquisition unit 201 determines whether or not the pixel values of all the pixels among the plurality of pixels included in the target area have been acquired. In a case of determining that the pixel values of all the pixels among the plurality of pixels included in the target area have not been acquired (No at S602), the pixel value acquisition unit 201 returns the processing to S601 and acquires the pixel value of another pixel whose pixel value has not been acquired yet. Further, in a case of determining that the pixel values of all the pixels among the plurality of pixels included in the target area have been acquired (Yes at S602), the pixel value acquisition unit 201 causes the processing to advance to S603.

At S603, the threshold value acquisition unit 203 acquires one threshold value among a plurality of threshold values configuring the threshold value group corresponding to the target area from the RAM 101 or the external storage device 105. Here, it is assumed that the threshold value of the threshold value group 401 shown in FIG. 4 is acquired.

At S604, the threshold value acquisition unit 203 determines whether or not all the threshold values among the plurality of threshold values configuring the threshold value group have been acquired. In a case of determining that all of the plurality of threshold values configuring the threshold value group have not been acquired (No at S604), the threshold value acquisition unit 203 returns the processing to S603 and acquires another threshold value that has not been acquired. Further, in a case of determining that all of the plurality of threshold values configuring the threshold value group have been acquired (Yes at S604), the threshold value acquisition unit 203 causes the processing to advance to S605. The processing at S601 and S602 and the processing at S603 and S604 do not have a mutual dependence relationship, and therefore, in a case where the processing is performed sequentially, it may also be possible to perform whichever processing first or perform the processing in parallel.

At S605, the number of dots calculation unit 202 calculates the target number of dots (that is, the number of dots that should be arranged within the target area) based on the pixel values acquired at S601 and S602 and the threshold values acquired at S603 and S604. Here, as described above, the average pixel value of all the pixels included in the target area is compared with the threshold value of the threshold value group corresponding to the target area and the number of threshold values less than the average pixel value is calculated as the target number of dots. For example, in FIG. 7, the average pixel value of all the pixels included in the target area 701 is "72" and in a case where this average pixel value is compared with each threshold value in the threshold value group 401 shown in FIG. 4, the number of threshold values less than the average pixel value is "4". That is, as the target number of dots, "4" is calculated.

At S606, the priority level determination unit 204 calculates (determines) the priority level according to which a dot is arranged in the target area based on the pixel values acquired at S601 and S602 and the threshold values acquired at S603 and S604. For each pixel in the target area, the threshold value that corresponds to the pixel position in the target area in terms of position in the threshold value group is subtracted from the pixel value and the subtraction result is calculated as a priority level.

In the example in FIG. 7, 16 pixels are included in the target area, and therefore, the priority level determination unit 204 calculates the priority level corresponding to each of the 16 pixels based on the pixel value in the target area 701 and the threshold value in the threshold value group 401. The pixel whose value calculated as the priority level is larger means that the priority level is higher, and therefore, a dot is arranged preferentially. Specifically, in FIG. 7, in a case where dots are arranged based on priority levels 702 determined (calculated) by the priority level determination unit 204, dots are arrange in order from the first pixel shown in an arrangement order 703.

At S607, the non-ejectable nozzle position acquisition unit 206 acquires the non-ejectable nozzle position from the RAM 101 or the external storage device 105. Here, it is assumed that the four positions shown by slashes in the area 503 in FIG. 5 described above are taken to be non-ejectable nozzle positions. That is, in the target area 701 shown in FIG. 7, each position in the third column from the left is the non-ejectable nozzle position.

At S608, the dot arrangement determination unit 205 selects the pixel as the dot arrangement-target pixel in order of the priority level in accordance with the priority level determined at S606. Then, the dot arrangement determination unit 205 arranges a dot by allocating "1" as the pixel value (output value) to the selected pixel. Then, this is repeated until the number of dots equal to the target number of dots calculated at S605 is arranged. Due to this, the output value of each pixel in the target area is determined. In a case where the position of the pixel selected as the dot arrangement-target pixel is the non-ejectable nozzle position, the output value is not changed (that is, the output value is caused to remain "0") and no dot is arranged.

Here, the dot arrangement determination processing is explained supplementally. In the following supplemental explanation, it is assumed that the target number of dots is "4" and the non-ejectable nozzle position is each position in the third column from the left in the target area 701. The dot arrangement determination unit 205 selects the first, the second, and the third pixels as the dot arrangement-target pixels in order from the pixel whose priority level is the highest based on the priority levels 702 and allocates "1" as the pixel value (output value). The fourth pixel that is selected next as the dot arrangement-target pixel is located at the non-ejectable nozzle position in the third column from the left in the target area 701. Because of this, the dot arrangement determination unit 205 causes the output value to remain "0" and arranges no dot for the pixel selected as the dot arrangement-target pixel (that is, the pixel located in the third row in the third column). In this case, "1" is allocated as the output value to the fifth pixel that is selected next as the dot arrangement-target pixel and due to this, a total of four dots equal to the target number of dots are arranged, and therefore, the dot arrangement determination unit 205 terminates dot arrangement. By arranging dots as above, the output value of each pixel is determined as shown in output results 704 in FIG. 7. Explanation is returned to the flowchart in FIG. 6.

At S609, the image processing unit 106 determines whether or not the processing has been completed for the entire target area in the input image data. In a case of determining that the processing has not been completed for the entire target area in the input image data (No at S609), the image processing unit 106 returns the processing to S601 and performs the above-described processing repeatedly. Further, in a case of determining that the processing has been completed for the entire target area in the input image data (Yes at S609), the image processing unit 106 terminates the processing shown in FIG. 6. The processing at S607 is processing that does not depend on the processing at S601 to S606, and therefore, it may also be possible to perform the processing at S607 in parallel to the processing at S601 to S606.

As explained above, the dot expected to be formed by the non-ejectable nozzle is formed in the pixel whose priority level is high within the same target area among the pixels at the ejectable nozzle positions. Due to this, there is no longer a defect of a dot resulting from the non-ejectable nozzle at the time of image formation and it is possible to form dots corresponding to the target number of dots within the target area. Further, dots are arranged in order from the pixel whose priority level is high, which is generated based on the pixel value group in the input image and the threshold value group corresponding thereto, and therefore, it is made possible to perform non-ejection complementation having improved reproducibility of input image data while suppressing unnatural density unevenness.

In the present embodiment, explanation is given on the premise that the dot to be arranged in the target area by the dot arrangement determination unit 205 has the single dot diameter, but the dot diameter is not necessarily limited to this. In a case where a plurality of kinds of dot diameter is used for the dots that are arranged in the target area, it is sufficient to design a configuration in which the dot having a larger dot diameter is arranged more preferentially. Due to this, it is possible to highly dispersively arrange large dots that are visually conspicuous, and therefore, dot arrangement with favorable granularity is enabled.

Second Embodiment

In the first embodiment, the method of arranging dots by taking into consideration the non-ejectable nozzle position at the time of generation of halftone image data is explained. In the present embodiment, a method is explained that rearranges a dot in the vicinity of the position at which a dot is expected to be formed by a non-ejectable nozzle for halftone image data (dot arrangement data after halftone processing is performed) generated without taking into consideration the non-ejectable nozzle position.
(Function Configuration of Image Processing Unit 106)

Figure 8:
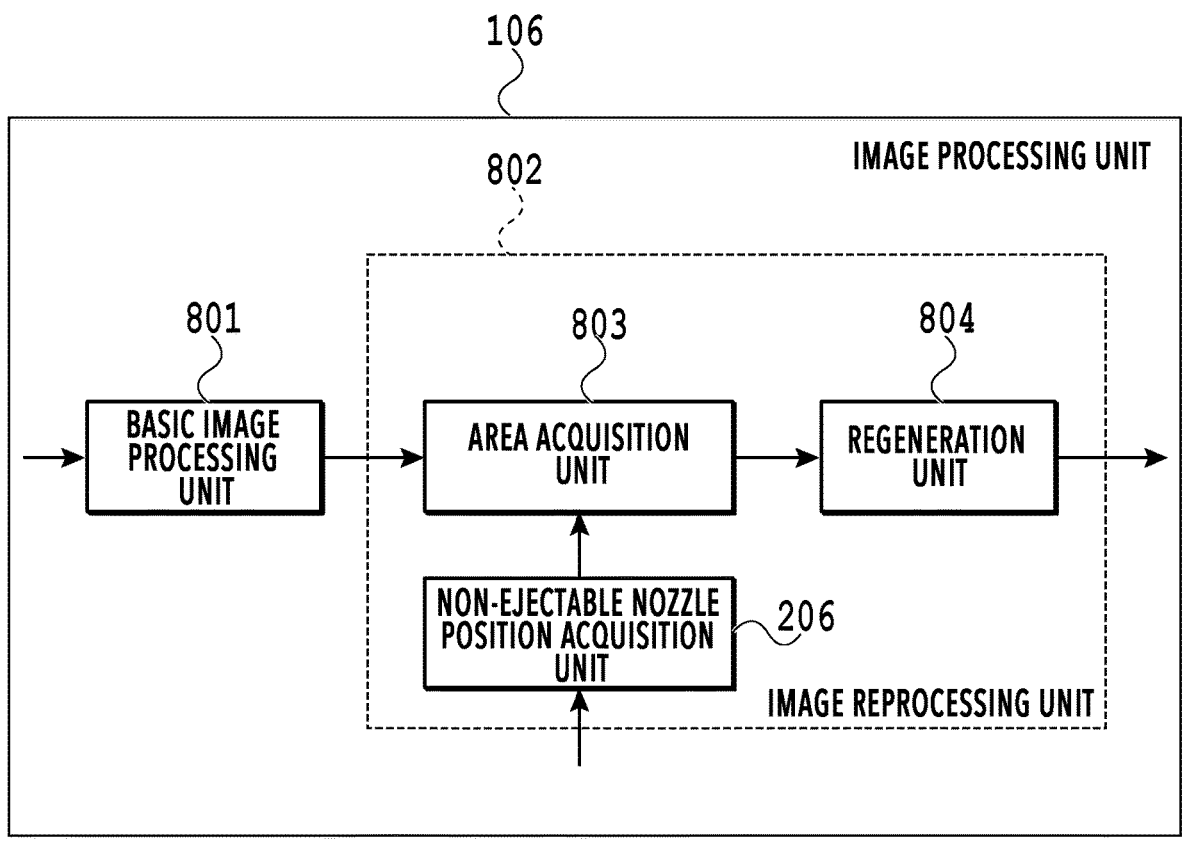
FIG. 8 is a diagram showing a function configuration of the image processing unit.

FIG. 8 is a diagram showing the function configuration of the image processing unit 106 of the image processing apparatus according to the present embodiment. The image processing unit 106 has a basic image processing unit 801 and an image reprocessing unit 802. Further, the image reprocessing unit 802 has the non-ejectable nozzle position acquisition unit 206, an area acquisition unit 803, and a regeneration unit 804.

The basic image processing unit 801 performs processing to generate halftone image data from input image data without taking into consideration the non-ejectable nozzle position and outputs the generated halftone image data to the image reprocessing unit 802.

The image reprocessing unit 802 performs processing to generate new halftone image data that takes into consideration the non-ejectable nozzle position by taking the halftone image data generated without taking into consideration the non-ejectable nozzle position as the input and outputs the generated halftone image data to the image forming unit 107. It is assumed that as the halftone image data generated without taking into consideration the non-ejectable nozzle position, an image of M tones is used.
(Function Configuration of Image Reprocessing Unit 802)

The area acquisition unit 803 acquires an area that is the processing target in the regeneration unit 804 (hereinafter, referred to as "target area"). It is assumed that the target area is the unit area with the non-ejectable nozzle as a center. Here, by using FIG. 9, the target area that is acquired by the area acquisition unit 803 is explained.

Figure 9:
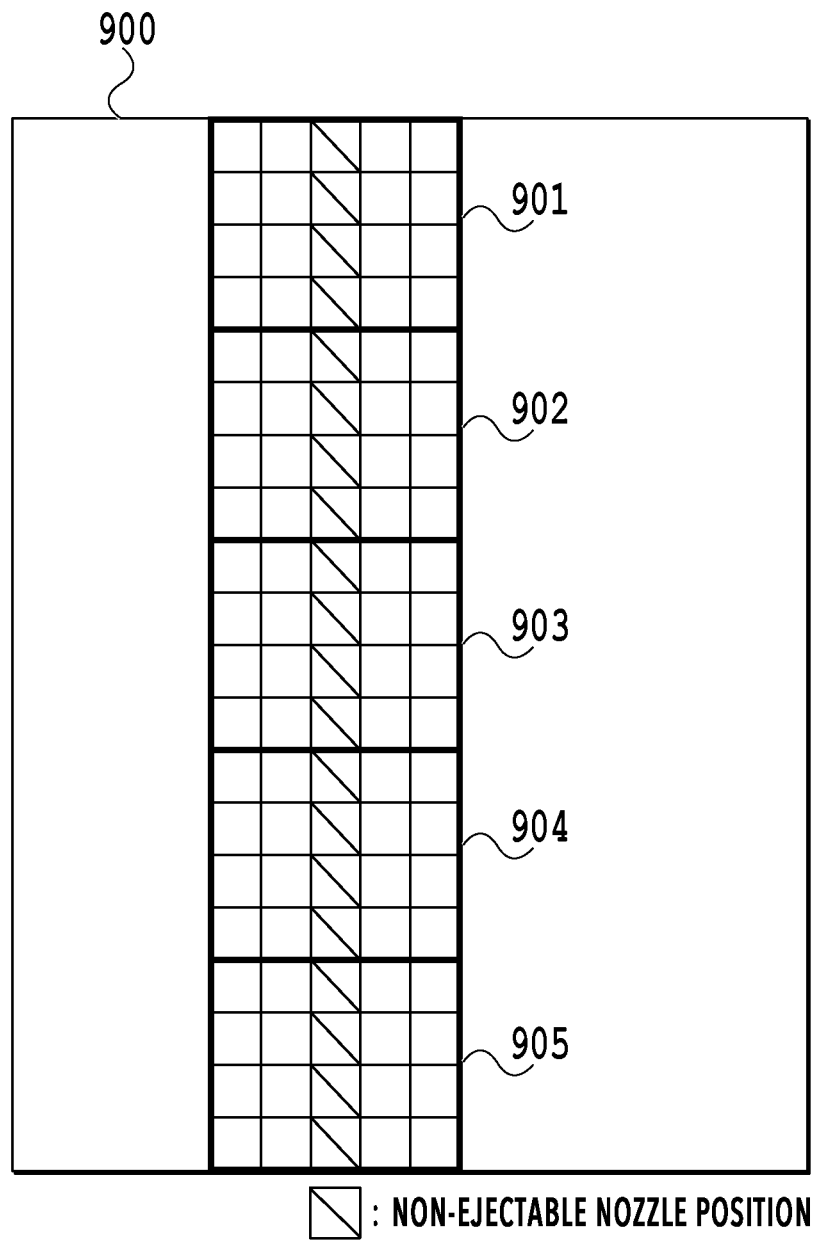
FIG. 9 is a diagram showing a target area acquired by an area acquisition unit.

In FIG. 9, in an area 900, a pixel column corresponding to a non-ejectable nozzle is shown. Further, it is assumed that the area 900 matches in size with the input image data. In this case, the area acquisition unit 803 sets five predetermined areas 901 to 905 surrounded by thick frames as candidates of the target area so that the areas 901 to 905 are bilaterally symmetrical with the non-ejectable nozzle position as a center. The area acquisition unit 803 further selects one of the target area candidates as a target area and outputs to the regeneration unit 804. As shown in FIG. 9, the size of the target area is set to four vertical pixels and five horizontal pixels and in the regeneration unit 804, the processing is performed by taking the 20 pixels included in the target area as the target.

The regeneration unit 804 generates new halftone image data by taking the halftone image data of the target area selected by the area acquisition unit 803 as the input and outputs to the image forming unit 107. Here, by using FIG. 10, the function configuration of the regeneration unit 804 is explained.

Figure 10:
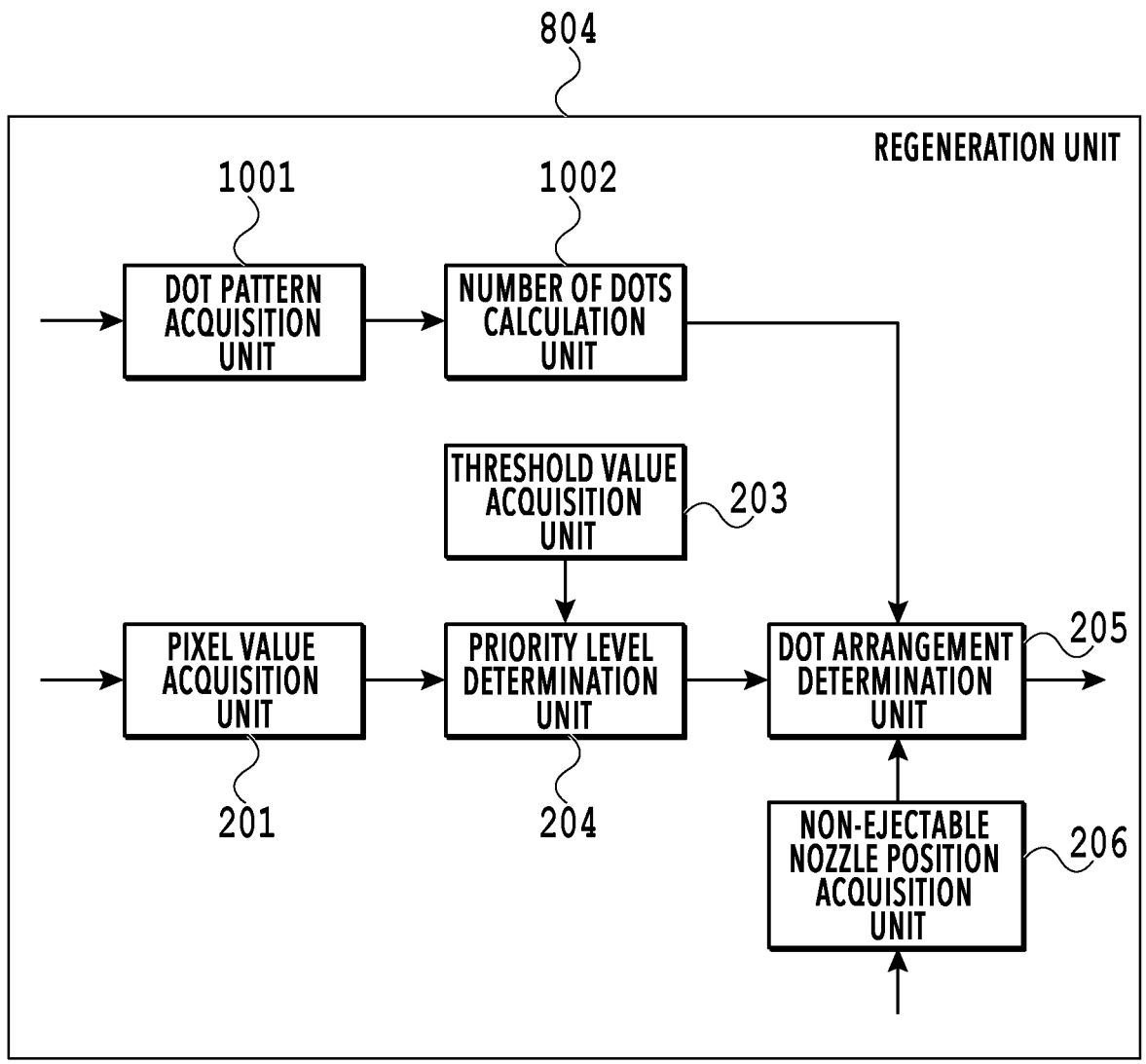
FIG. 10 is a diagram showing a function configuration of a regeneration unit.

As shown in FIG. 10, the regeneration unit 804 has a dot pattern acquisition unit 1001, a number of dots calculation unit 1002, the pixel value acquisition unit 201, the threshold value acquisition unit 203, the priority level determination unit 204, the dot arrangement determination unit 205, and the non-ejectable nozzle position acquisition unit 206. In the following, explanation of the block to which the same symbol as that in FIG. 2 of the first embodiment is attached is omitted and here, the dot pattern acquisition unit 1001 and the number of dots calculation unit 1002 are explained.

The dot pattern acquisition unit 1001 acquires the halftone image data of the target area selected by the area acquisition unit 803. The number of dots calculation unit 1002 acquires (calculates) the target number of dots of the target area by counting the pixels having the same pixel value among the halftone image data acquired from the dot pattern acquisition unit 1001. At this time, the pixel whose pixel value is "0" means the pixel in which the dot is off, and therefore, it is not necessary to count the pixel whose pixel value is "0".
(Processing Procedure in Image Processing Unit 106)

Figure 11:
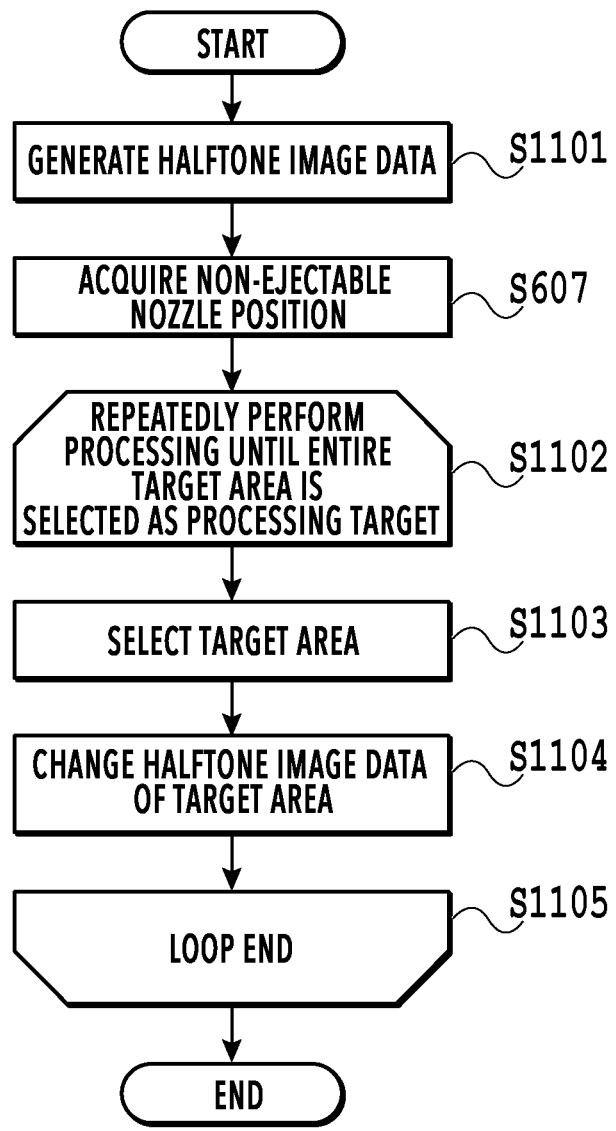
FIG. 11 is a diagram showing a procedure of processing in the image processing unit.
Figure 12:
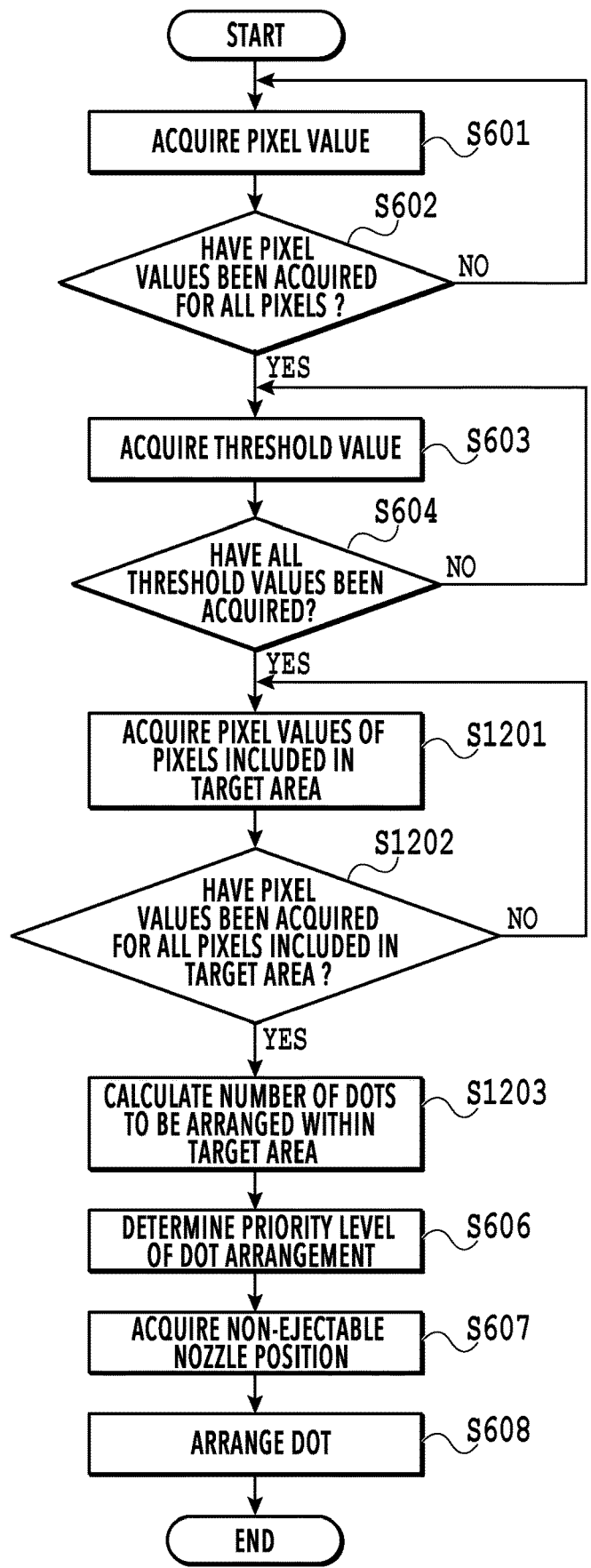
FIG. 12 is a diagram showing a procedure of processing in the regeneration unit.
Figure 13:
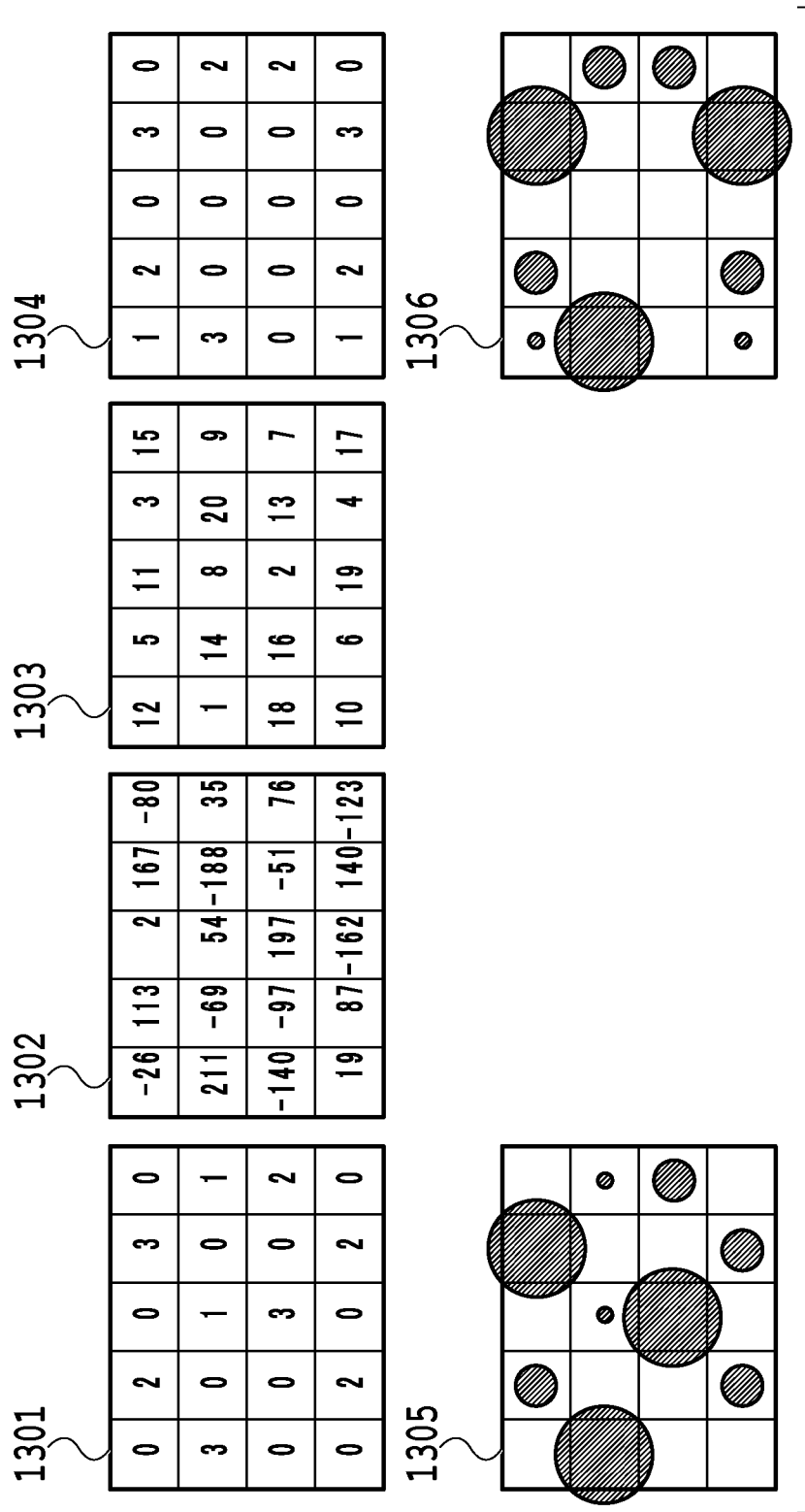
FIG. 13 is a diagram showing data used in the processing in the regeneration unit and processing results obtained in a process of the processing.

Next, by using the flowchart in FIG. 11, the procedure of the processing in the image processing unit 106 is explained. Further, by using the flowchart in FIG. 12, the processing procedure at S1104 in the flow in FIG. 11 in the regeneration unit 804 is explained. Furthermore, FIG. 13 shows data used in the processing shown in the flow in FIG. 12 and processing results obtained in a process of the processing.

In the present embodiment, it is assumed that halftone image data of four tones using three kinds of dot diameter, that is, a large dot diameter, a medium dot diameter, and a small dot diameter, is handled. It is also assumed that the pixel whose pixel value (output value) is "0" in the halftone image data of four tones indicates off of a dot. Further, it is assumed that the pixel whose pixel value is "1" indicates a dot whose dot diameter is small, the pixel whose pixel value is "2" indicates a dot whose dot diameter is medium, and the pixel whose pixel value is "3" indicates a dot whose dot diameter is large. In addition, it is assumed that a dot whose dot diameter is small is referred to as "small dot", a dot whose dot diameter is medium as "medium dot", and a dot whose dot diameter is large as "large dot".

At S1101, the basic image processing unit 801 generates halftone image data from the input image data. As described above, in a case of generating halftone image data, it may also be possible to perform dither processing using a threshold value matrix or use the method described in Japanese Patent Laid-Open No. 2004-58284.

In a case where the non-ejectable nozzle position is acquired by the non-ejectable nozzle position acquisition unit 206 at S607, the processing up to S1105 is performed repeatedly until all the areas that may be the processing target are selected as the target area at S1102. Specifically, for example, in a case of the area 900 shown in FIG. 9, the processing at S1102 to S1105 is performed repeatedly five times.

At S1103, the area acquisition unit 803 sets a plurality of areas that may be target area candidates and selects one of them as the target area. Specifically, for example, it is assumed that the area acquisition unit 803 selects the area 901 first as the target area after setting the areas 901 to 905 shown in FIG. 9 as candidates. Then, in a case where the processing for the area 901 is completed, the area acquisition unit 803 continues the processing by selecting the area 902 as the next target area and repeats the processing until the processing for the area 905 is completed.

At S1104, the regeneration unit 804 changes the halftone image data of the target area. Here, as described above, details of the processing at S1104 in the regeneration unit 804 are explained by using the flowchart in FIG. 12.

(Processing Procedure in Regeneration Unit 804)

At S1201, the dot pattern acquisition unit 1001 acquires the pixel values of the pixels included in the target area selected at S1103 among the halftone image data generated at S1101. Specifically, for example, it is assumed that each pixel value of halftone image data 1301 shown in FIG. 13 is acquired. What represents the image that is formed based on the halftone image data 1301 is an image 1305.

At S1202, the dot pattern acquisition unit 1001 determines whether or not the pixel values of all the pixels included in the target area have been acquired. In a case of determining that the pixel values of all the pixels included in the target area have not been acquired (No at S1202), the dot pattern acquisition unit 1001 returns the processing to S1201 and acquires the pixel value of another pixel, which has not been acquired. Further, in a case of determining that the pixel values of all the pixels included in the target area have been acquired (Yes at S1202), the dot pattern acquisition unit 1001 causes the processing to advance to S1203. The processing at S601 and S602 and the processing at S603 and S604 are processing that do not have a mutual dependence relationship, and therefore, in a case where the processing is performed sequentially, it may also be possible to perform whichever processing first or perform the processing in parallel.

At S1203, the number of dots calculation unit 1002 calculates the number of dots that are arranged within the target area (hereinafter, referred to as target number of dots) based on the pixel values of the halftone image data, which are acquired at S1201 and S1202. Specifically, the number of dots calculation unit 1002 calculates the target number of dots classified for each dot diameter by counting the pixels having the same pixel value among all the acquired pixel values. For example, in the halftone image data 1301, there are three pixels whose pixel value is "3", four pixels whose pixel value is "2", and two pixels whose pixel value is "1". In this case, the target number of dots is calculated as "three large dots, four medium dots, and two small dots". As described previously, the pixel whose pixel value is "0" means a pixel whose dot is off, and therefore, it is not necessary to count the pixel. After this, in a case where each piece of the processing at S606 to S608 in FIG. 12 is performed, new halftone image data 1304 is generated and output based on priority levels 1302 (arrangement order 1303). What represents the image that is formed based on the halftone image data 1304 is an image 1306.

As explained above, in the present embodiment, by taking an area having a width of a plurality of pixels bilaterally symmetrical with the non-ejectable nozzle position as a center to be the target area, it is possible to perform bilaterally symmetrical non-ejection complementation (dot movement) compared to the above-described first embodiment. Further, it is not necessary for the number of dots calculation unit 1002 of the present embodiment to calculate the target number of dots based on the pixel value group of the input image data and the threshold value group corresponding thereto and it is only required to refer to the acquired output values of the halftone image data. Furthermore, even in a case where a non-ejectable nozzle occurs suddenly, it is sufficient to reconfigure the dots in the vicinity of the non-ejectable nozzle position for the halftone image data (dot arrangement data) generated by the halftone processing. Consequently, it is possible to perform the processing at a high speed compared to the first embodiment.

In order to make less conspicuous a white spot resulting from a non-ejectable nozzle, it is preferable to form an alternate dot by a nozzle as close as possible to the non-ejectable nozzle in terms of position. In that meaning, in the present embodiment, the pixel size of the unit area is set to four vertical pixels and five horizontal pixels, but it is preferable to change the pixel columns of the unit area to the pixel columns corresponding to three nozzles, that is, to change the unit area to four vertical pixels and three horizontal pixels. Due to this, the dot expected to be formed by a non-ejectable nozzle is rearranged in one of the pixel columns adjacent to the pixel column in which the dot is to be arranged. Then, in image formation, it is possible to eject ink from the nozzle adjacent to the non-ejectable nozzle. Further, by changing the area width in the vertical direction of the unit area to a width of one pixel (that is, by changing the unit area to one vertical pixel and three horizontal pixels), it is possible to rearrange the dot expected to be formed by a non-ejectable nozzle in one of the pixels adjacent to the pixel in which the dot is to be arranged. In this case, it is possible to maintain the dot pattern close to the original dot pattern.

Third Embodiment

In the second embodiment, the method is explained that rearranges the dot in the vicinity of the position at which a dot is expected to be formed by a non-ejectable nozzle for the halftone image data generated without taking into consideration the non-ejectable nozzle. In the present embodiment, a method is explained that preferentially rearranges a dot in the pixel column adjacent to the non-ejectable nozzle position in order to make less conspicuous a white streak resulting from the non-ejectable nozzle.

Figure 14:
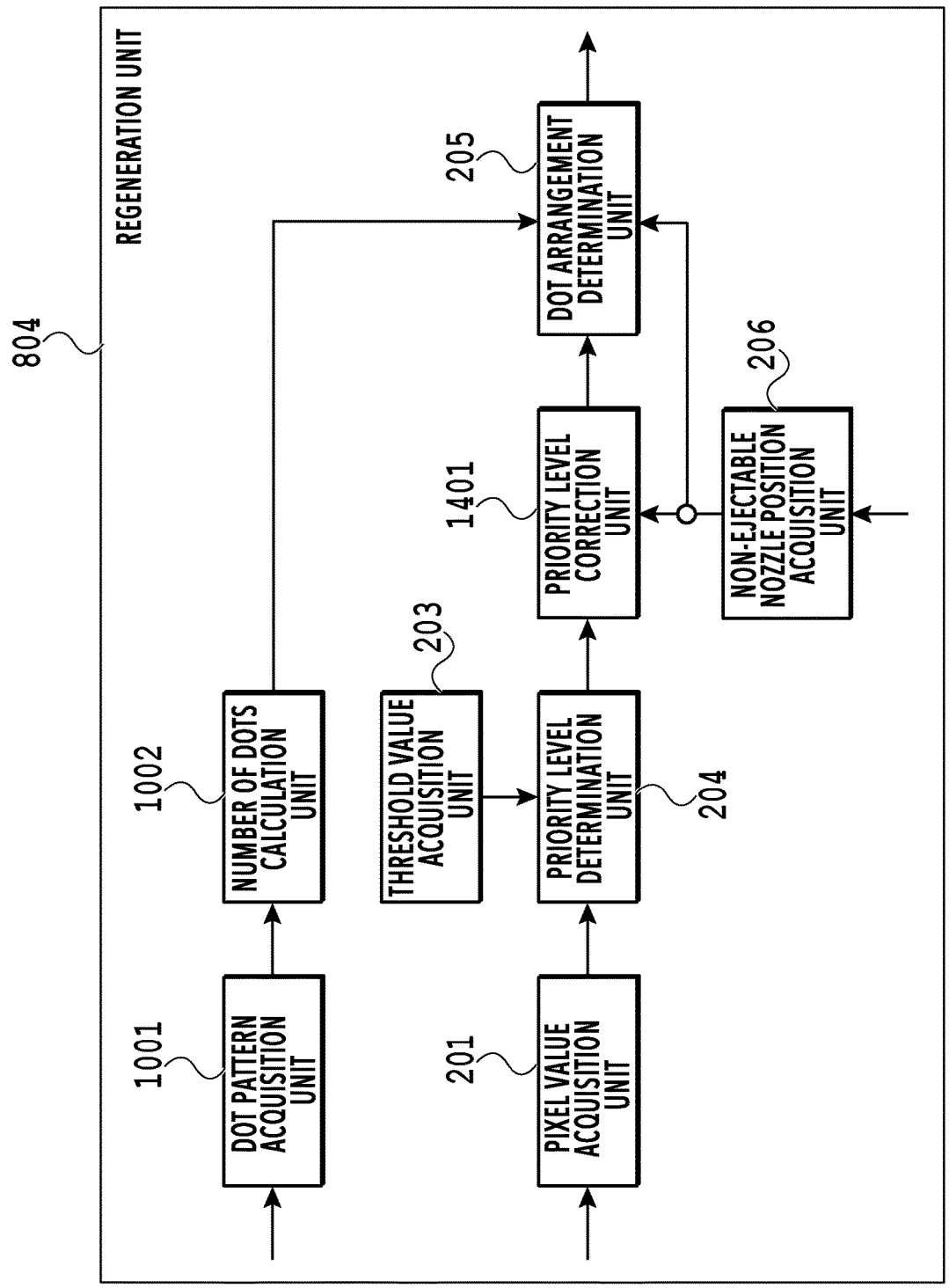
FIG. 14 is a diagram showing a function configuration of the regeneration unit.

FIG. 14 is a diagram showing the function configuration of the regeneration unit 804 of the image processing apparatus according to the present embodiment. As shown in FIG. 14, the regeneration unit 804 has the dot pattern acquisition unit 1001, the number of dots calculation unit 1002, the pixel value acquisition unit 201, the threshold value acquisition unit 203, the priority level determination unit 204, the dot arrangement determination unit 205, the non-ejectable nozzle position acquisition unit 206, and a priority level correction unit 1401. In the following, explanation of the block to which the same symbol as that in FIG. 10 of the second embodiment is attached is omitted and here, the priority level correction unit 1401 is explained.

(Function Configuration of Regeneration Unit 804)

The priority level correction unit 1401 corrects the priority level determined by the priority level determination unit 204 based on the non-ejectable nozzle position so that the dot expected to be formed by a non-ejectable nozzle is more likely to be rearranged in the pixel column adjacent to the non-ejectable nozzle position. The priority level correction unit 1401 outputs the corrected priority level to the dot arrangement determination unit 205.

(Processing Procedure in Regeneration Unit 804)

Figure 15:
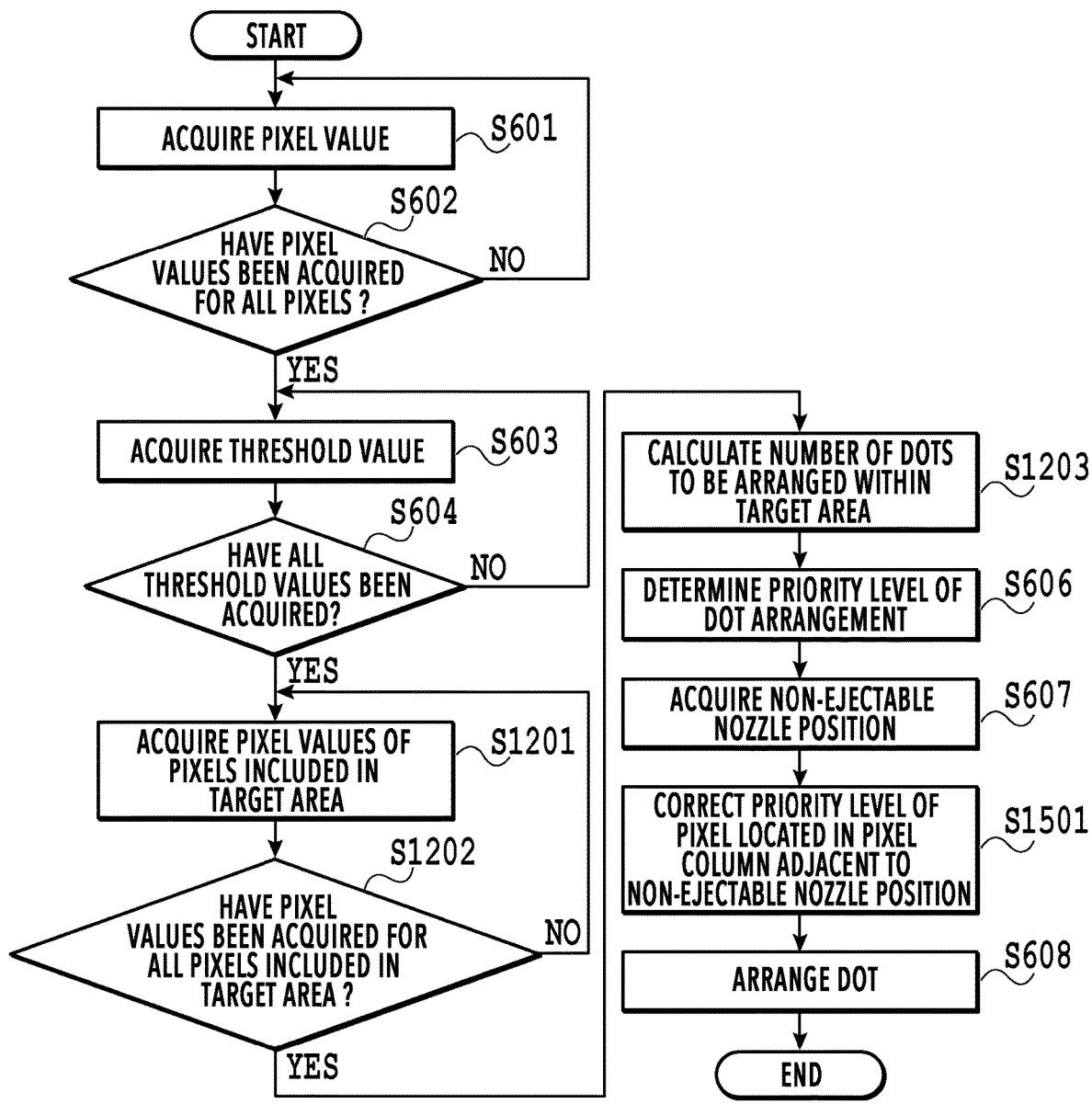
FIG. 15 is a diagram showing a procedure of processing in the regeneration unit.

FIG. 15 is a flowchart showing the procedure of the processing in the regeneration unit 804. In the flowchart shown in FIG. 15, between the processing at S607 and the processing at S608 in the flowchart shown in FIG. 12 of the above-described second embodiment, processing at S1501 is added. Here, the processing at S1501 that is added anew is explained mainly. Further, FIG. 16 shows data used in the processing shown in FIG. 15 and processing results obtained in a process of the processing.

At S1501, the priority level correction unit 1401 corrects the priority level of the pixel located in the pixel column adjacent to the non-ejectable nozzle position based on the priority level determined at S606 and the non-ejectable nozzle position acquired at S607. The priority level correction unit 1401 outputs the corrected priority level to the dot arrangement determination unit 205. In the following, this corrected priority level is referred to as "corrected priority level".

Next, by using FIG. 16, the processing to correct priority level in the priority level correction unit 1401 is explained. In FIG. 16, priority levels 1601 are priority levels determined by the priority level determination unit 204. As a supplement, what represents an image that is formed based on the priority levels 1601 is an image 1604. Here, it is assumed that the target number of dots is "three large dots, four medium dots, and two small dots".

The priority level correction unit 1401 corrects the priority levels 1601 by using correction values 1602. As the correction values 1602, a positive value is allocated to only the pixel located in the pixel column adjacent to the non-ejectable nozzle position and "0" is allocated to the other pixels. Here, as correction of the priority level, each of the correction values 1602 is added to each of the priority levels 1601 for each corresponding pixel. Corrected priority levels 1603 are priority levels after being corrected by the priority level correction unit 1401 and what represents the image that is formed based on the corrected priority levels 1603 is an image 1605.

As described above, by correcting (increasing) the priority level of the pixel located in the pixel column adjacent to the non-ejectable nozzle position, as a result, a dot becomes more likely to be rearranged in the pixel located in the pixel column adjacent to the non-ejectable nozzle position. In the present embodiment, as correction of the priority level, the example is explained in which only the pixel located in the pixel column adjacent to the non-ejectable nozzle position is taken as the target and the priority level thereof is increased. However, the example is not limited to this. For example, it may also be possible to set a correction value (see correction values 1606) so that the value becomes small in accordance with the distance from the non-ejectable nozzle position (as becoming more distant from the non-ejectable nozzle position) also for the priority level of the pixel located in the pixel column two or more pixels apart from the non-ejectable nozzle position. By using the correction values 1606 in place of the correction values 1602 in the processing of the priority level correction unit 1401, it is also possible to correct the priority level of the pixel located in the pixel column two or more pixels apart from the non-ejectable nozzle position.

Fourth Embodiment

In the second embodiment, the specifications are explained in which the number of dots for each dot diameter within the target area does not change before and after the dot rearrangement. However, in a case where dots are arranged in all the pixels within the target area, a pixel in which a dot arranged at the non-ejectable nozzle position is arranged anew does not exist. In this case, it is not possible to arrange a dot anew within the target area, and therefore, it is not possible to sufficiently compensate for a dot expected to be formed by the non-ejectable nozzle.

Consequently, in the present embodiment, a method is explained that performs compensation by acquiring the target number of dots from the dots at the non-ejectable nozzle positions within the target area, converting the target number of dots into the compensation value, and further changing the dot diameter of the dot located at the position other than the non-ejectable nozzle position within the target area.

Figure 17:
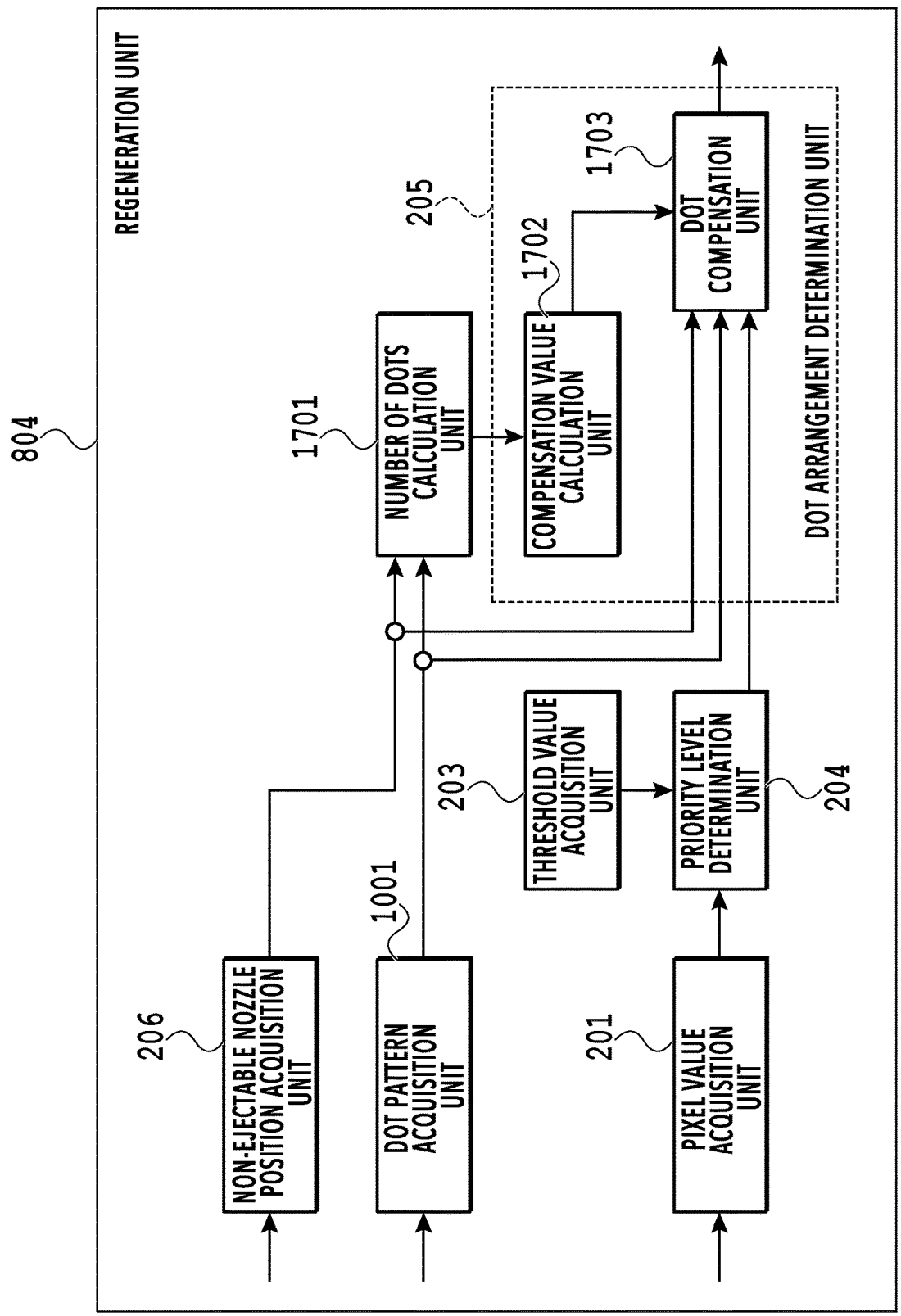
FIG. 17 is a diagram showing a function configuration of the regeneration unit.

FIG. 17 is a diagram showing the function configuration of the regeneration unit 804 of the image processing apparatus according to the present embodiment. As shown in FIG. 17, the regeneration unit 804 has the dot pattern acquisition unit 1001, the pixel value acquisition unit 201, the threshold value acquisition unit 203, the priority level determination unit 204, the dot arrangement determination unit 205, the non-ejectable nozzle position acquisition unit 206, and a number of dots calculation unit 1701. Further, the dot arrangement determination unit 205 has a compensation value calculation unit 1702 and a dot compensation unit 1703. In the following, explanation of the block to which the same symbol as that in FIG. 10 of the second embodiment is attached is omitted and here, the number of dots calculation unit 1701, the compensation value calculation unit 1702, and the dot compensation unit 1703 are explained.

(Function Configuration of Regeneration Unit 804)

The number of dots calculation unit 1701 calculates the target number of dots and outputs the calculated number of dots to the compensation value calculation unit 1702. The number of dots calculation unit 1701 differs from the number of dots calculation unit 1002 according to the above-described second embodiment in the target range for which the dots are counted. That is, the number of dots calculation unit 1002 of the second embodiment takes the target range for which dots are counted as the entire target area. On the other hand, the number of dots calculation unit 1701 of the present embodiment takes the target range for which dots are counted as only pixels located at the non-ejectable nozzle positions acquired by the non-ejectable nozzle position acquisition unit 206. The number of dots calculation unit 1701 differs from the number of dots calculation unit 1002 of the second embodiment only in the target range for which dots are counted and the method of counting dots is the same as that in the above-described second embodiment.

The compensation value calculation unit 1702 calculates the compensation value based on the target number of dots acquired from the number of dots calculation unit 1701 and outputs the compensation value to the dot compensation unit 1703. The compensation value is obtained by finding the total sum of the output values from the output value allocated for each dot diameter and the target number of dots for each dot diameter. For example, it is assumed that the target number of dots is one large dot, two medium dots, and one small dot and in the halftone image data, an output value of "3" is allocated to the large dot, an output value of "2" to the medium dot, and an output value of "1" to the small dot. In this case, the compensation value is calculated as "8" that is the total sum of "3", "2", "2", and "1".

The dot compensation unit 1703 cancels the dot arranged at the non-ejectable nozzle position in the halftone image data acquired from the dot pattern acquisition unit 1001 and generates and outputs new halftone image data by compensating for a dot based on the priority level and the compensation value. Here, compensation of a dot means to increase the dot diameter of the dot to a one-size larger dot diameter in a case where a dot is already arranged in the target pixel and arrange anew a dot having the minimum diameter in a case where no dot is arranged in the target pixel. In a case where a dot having the maximum diameter is already arranged in the target pixel, compensation of a dot is not performed.

In the following, the processing in the dot compensation unit 1703 is explained supplementally. First, in the stage of canceling dots, dots are made off by replacing the pixel values of all the pixels located at the non-ejectable nozzle positions acquired by the non-ejectable nozzle position acquisition unit 206 among the acquired halftone image data with "0". Next, in the stage of compensating for a dot, the above-described dot compensation is performed by selecting pixels one by one based on the priority level determined by the priority level determination unit 204 and the compensation value calculated by the compensation value calculation unit 1702 among the acquired halftone image data. In the following explanation, this selected pixel is referred to as "compensation-target pixel".

The dot compensation unit 1703 repeatedly performs the above-described dot compensation the number of times equal to the compensation value calculated by the compensation value calculation unit 1702. However, in a case where a dot having the maximum diameter is arranged in all the compensation-target pixels, the dot compensation unit 1703 immediately terminates the dot compensation.

(Processing Procedure in Regeneration Unit 804)

Figure 18:
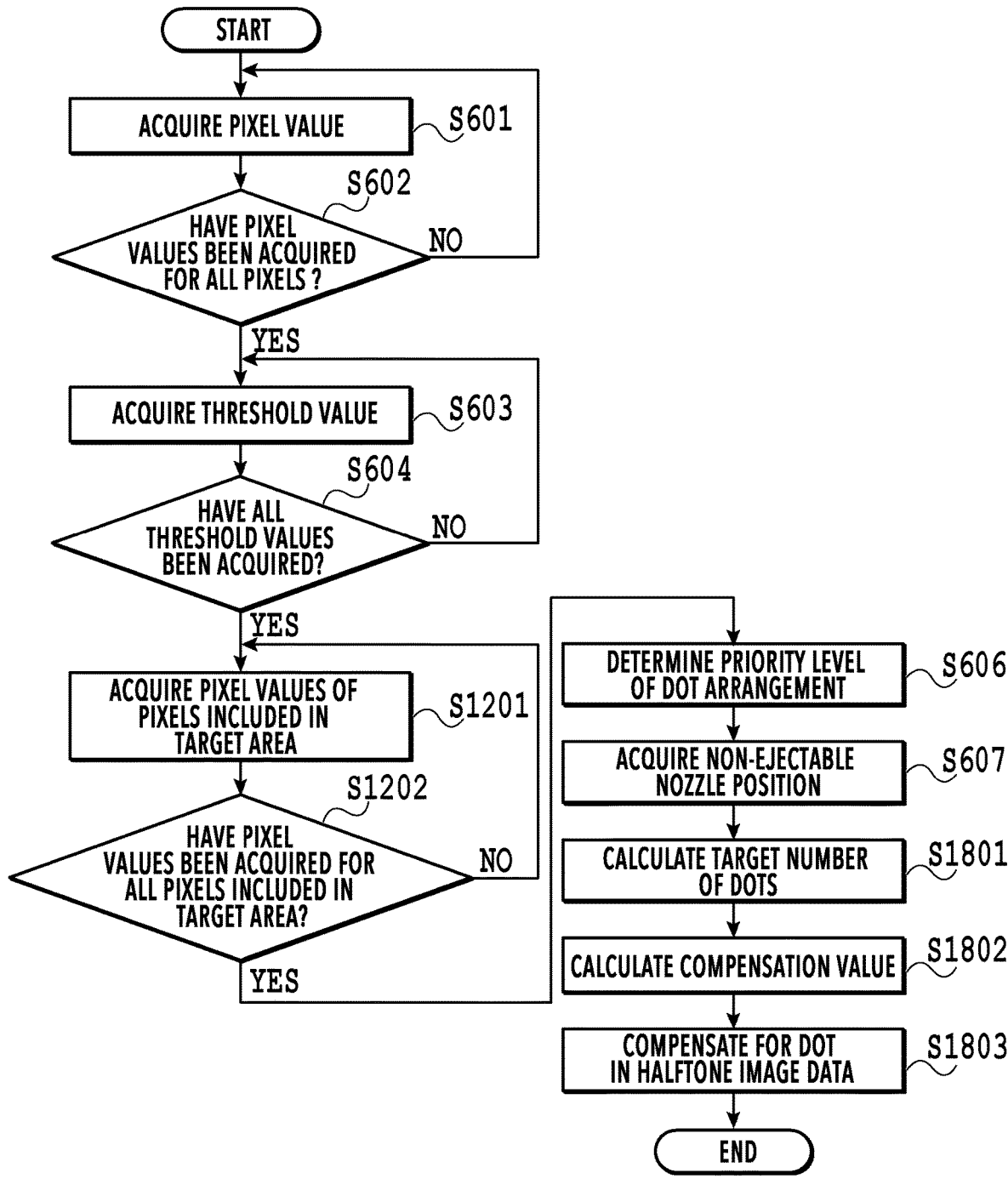
FIG. 18 is a diagram showing a procedure of processing in the regeneration unit.
Figure 19:
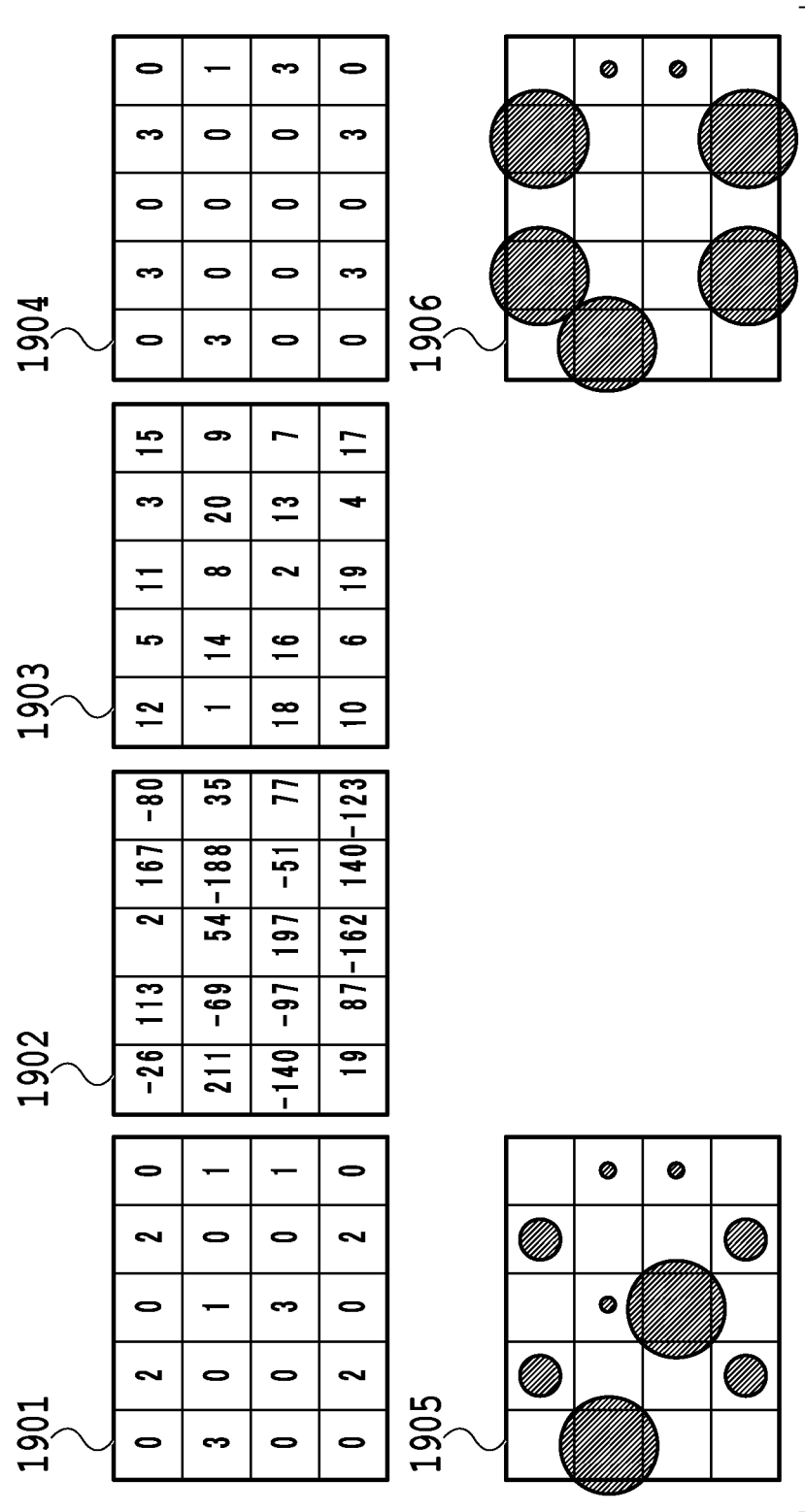
FIG. 19 is a diagram showing data used in the processing in the regeneration unit and processing results obtained in a process of the processing.

FIG. 18 is a flowchart showing the procedure of the processing in the regeneration unit 804 and this flowchart differs from the flowchart shown in FIG. 12 of the above-described embodiment in processing at S1202 and subsequent steps. Here, explanation is given by focusing attention mainly on points different from the second embodiment. Further, FIG. 19 shows data used in the processing shown in FIG. 18 and processing results obtained in a process of the processing.

At S1801, the number of dots calculation unit 1701 acquires (calculates) the target number of dots from the dots arranged at the non-ejectable nozzle positions based on the non-ejectable nozzle positions acquired at S607 and the halftone image data of the target area, which is acquired at S1201. Specifically, in a case where the non-ejectable nozzle position is the center column of halftone image data 1901 in FIG. 19, the number of dots calculation unit 1701 acquires the target number of dots by counting the dots located in the center column. In a case of the halftone image data 1901 shown in FIG. 19, the number of dots calculation unit 1701 acquires one large dot and one small dot as the target number of dots.

At S1802, the compensation value calculation unit 1702 calculates the compensation value based on the target number of dots acquired at S1801. Here, as the target number of dots, one large dot and one small dot are acquired and in the halftone image data, an output value of "3" is allocated to the large dot, an output value of "2" to the medium dot, and an output value of "1" to the small dot. In this case, the compensation value calculated from the target number of dots is "4".

At S1803, the dot compensation unit 1703 cancels the dot arranged at the non-ejectable nozzle position in the halftone image data and performs dot compensation for the compensation-target pixel based on the priority level acquired at S606 and the compensation value calculated at S1802.

Specific explanation is given by taking the case of FIG. 19 described previously as an example. In FIG. 19, the image that is formed based on the halftone image data 1901 is shown as an image 1905. Further, it is assumed that the non-ejectable nozzle position is the center column of the halftone image data 1901 and priority levels 1902 are obtained. Furthermore, the order of being selected as the compensation-target pixel based on the priority levels 1902 is shown as a compensation target order 1903. Then, as described above, it is assumed that "4" is calculated as the compensation value.

First, the dot compensation unit 1703 focuses attention on the pixel indicating the first (that is, the pixel whose output value is "3", which is located in the second row in the first column) in the compensation target order 1903 and selects the pixel as the compensation-target pixel. In the compensation-target pixel relating to the selection, a large dot is already arranged. Consequently, in this case, dot compensation is not performed. Next, the dot compensation unit 1703 focuses attention on the pixel indicating the second (that is, the pixel whose output value is "0", which is located in the third row in the third column) in the compensation target order 1903 and selects the pixel as the compensation-target pixel. The compensation-target pixel relating to the selection is the pixel located at the non-ejectable nozzle position. Consequently, in this case also, dot compensation is not performed.

Following the above, the dot compensation unit 1703 focuses attention on the pixel indicating the third (that is, the pixel whose output value is "2", which is located in the first row in the fourth column) in the compensation target order 1903 and selects the pixel as the compensation-target pixel. In the compensation-target pixel relating to the selection, a medium dot is arranged. Consequently, dot compensation to change the medium dot into the large dot whose dot diameter is one size larger and arrange the large dot. That is, in this case, the dot compensation unit 1703 performs the processing to change the pixel value from "2" to "3" by increasing the pixel value (output value) of the compensation-target pixel by one level.

After this, in accordance with the compensation target order 1903, the dot compensation processing is performed similarly also for each of the fourth pixel to the sixth pixel. In a case where the dot compensation processing for the pixel indicating the sixth in the compensation target order 1903 is performed, the number of times the dot compensation is performed becomes four and this means that the dot compensation is performed the number of times equal to the compensation value, and therefore, the dot compensation unit 1703 terminates the processing at S1803. Halftone image data 1904 thus obtained, for which the dot compensation processing has been performed, is output as a result. What represents the image that is formed based on the halftone image data 1904 thus output is an image 1906.

As explained above, even in a case where dots are arranged in all the pixels within the target area, by performing the above-described dot compensation, non-ejection complementation is enabled. Further, by increasing the dot diameter in order from the pixel whose priority level is the highest at the time of performing dot compensation, it is possible to arrange visually conspicuous large dots highly dispersedly.

As regards the dot compensation processing, in a case where the number of times the dot compensation is performed is less than the compensation value after the dot compensation is performed in accordance with the compensation target order from the first through the last, it may also be possible to perform the dot compensation again in accordance with the compensation target order from the first through the last. In particular, in a case where there is a pixel in which a dot cannot be arranged, such as a thin line, by performing the dot compensation a plurality of times in accordance with the compensation target order from the first through the last, it is possible to perform the dot compensation sufficiently capable of dealing with a dot defect due to a non-ejectable nozzle while suppressing degradation of sharpness.

Fifth Embodiment

In the second embodiment, all the dots within the target area are taken as the rearrangement target and the priority level of the pixel not located at the non-ejectable nozzle position is referred to in a case of selecting a pixel to be rearranged. In the present embodiment, a method is explained that rearranges only the dot arranged at the non-ejectable nozzle position in another pixel located at a position other than the non-ejectable nozzle position based on the priority level of the pixel located at the non-ejectable nozzle position and the priority level of the pixel located at the position other than the non-ejectable nozzle position.

Figure 20:
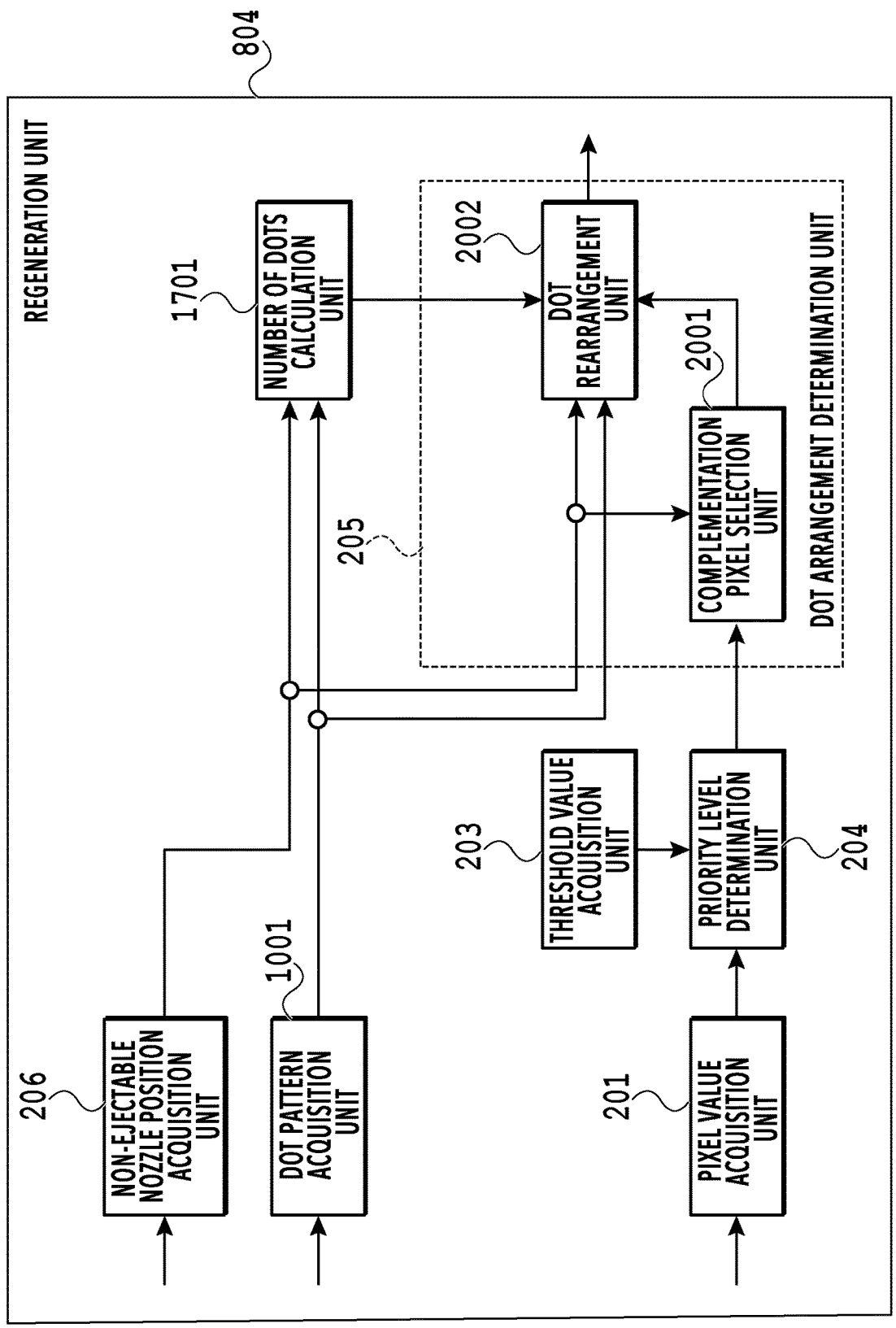
FIG. 20 is a diagram showing a function configuration of the regeneration unit.

FIG. 20 is a diagram showing the function configuration of the regeneration unit 804 of the image processing apparatus according to the present embodiment. As shown in FIG. 20, the regeneration unit 804 has the dot pattern acquisition unit 1001, the pixel value acquisition unit 201, the threshold value acquisition unit 203, the priority level determination unit 204, the dot arrangement determination unit 205, the non-ejectable nozzle position acquisition unit 206, and the number of dots calculation unit 1701. Further, the dot arrangement determination unit 205 has a complementation pixel selection unit 2001 and a dot rearrangement unit 2002. In the following, explanation of the block to which the same symbol as that in FIG. 10 of the second embodiment is attached is omitted and here, the complementation pixel selection unit 2001 and the dot rearrangement unit 2002 are explained.

(Function Configuration of Regeneration Unit 804)

The complementation pixel selection unit 2001 selects a plurality of complementation pixels, each being a candidate of a pixel in which a dot is rearranged, and determines the arrangement order of rearranging dots in the selected plurality of complementation pixels. The determined contents are output to the dot rearrangement unit 2002 as the complementation pixel arrangement order. The complementation pixel arrangement order is a matrix having "0" or the values of a natural number and the values of a natural number indicate the arrangement order of the dots for the complementation pixels. For example, the pixel having a value of "1" is a pixel for which an attempt of rearrangement is made first at the time of rearranging dots and the pixel having a value of "0" is a pixel that is not the target of dot rearrangement.

The complementation pixel arrangement order is determined by two pieces of processing, that is, the processing to select a complementation center pixel based on the priority level and the non-ejectable nozzle position and the processing to determine the complementation pixel arrangement order based on the complementation center pixel. First, the complementation pixel selection unit 2001 selects a pixel in order that is a pixel located at the non-ejectable nozzle position acquired from the non-ejectable nozzle position acquisition unit 206 and whose priority level is high among the priority levels acquired from the priority level determination unit 204. The pixel selected here is referred to as "complementation center pixel".

Next, the complementation pixel selection unit 2001 determines complementation pixel candidates for the complementation center pixel. The complementation pixel candidates are two adjacent pixels formed by nozzles different from that of the complementation center pixel, that is, two pixels adjacent to the complementation center pixel from left and right with the complementation center pixel as a reference.

After selecting the complementation center pixel, the complementation pixel selection unit 2001 determines the complementation pixel arrangement order number for the complementation pixel candidate of the complementation center pixel and allocates the complementation pixel arrangement order number as a numerical value. The complementation pixel arrangement order number is determined in accordance with the priority level of the complementation pixel candidate. Specifically, of the two pixels adjacent to the complementation center pixel from left and right, in order from the pixel whose priority level is higher, a numerical value is allocated as the complementation pixel arrangement order number by increasing the numerical value as "1" and "2".

Then, after allocating the complementation pixel arrangement order number to the complementation pixel candidate with the complementation center pixel as a reference, the complementation pixel selection unit 2001 sequentially selects the next complementation center pixel in accordance with the priority level and repeats the same processing and allocates "3" and "4" as the complementation pixel arrangement order numbers. As described above, each time the complementation center pixel is selected in accordance with the priority level, the complementation pixel arrangement order number is allocated to the complementation pixel candidate of the selected complementation center pixel by increasing the complementation pixel arrangement order number. Then, after allocating the complementation pixel arrangement order number, the complementation pixel selection unit 2001 allocates "0" as the complementation pixel arrangement order number to the pixel that is not selected as the complementation pixel candidate. The complementation pixel arrangement order thus obtained is output to the dot rearrangement unit 2002.

The dot rearrangement unit 2002 cancels the dot (changes the dot to off) of the pixel located at the non-ejectable nozzle position in the halftone image data and rearranges a dot based on the complementation pixel arrangement order. Here, the processing to cancel the dot arrangement is the same as that of the dot compensation unit 1703 of the above-described fourth embodiment, and therefore, explanation is omitted and processing to rearrange a dot based on the complementation pixel arrangement order is explained.

The dot rearrangement unit 2002 selects pixels one by one based on the complementation pixel arrangement order acquired from the complementation pixel selection unit 2001 in the halftone image data acquired from the dot pattern acquisition unit 1001 and an attempt to rearrange a dot is made. The dot rearrangement unit 2002 repeatedly performs the dot rearrangement until dots corresponding to the target number of dots acquired from the number of dots calculation unit 1701 are rearranged or a pixel in which a dot is not arranged no longer exists. Here, the dot rearrangement is processing to preferentially arrange a dot whose dot diameter is large of the target number of dots in a case where a dot is not arranged in the pixel selected in the halftone image data. That is, the dot rearrangement is processing to update the output value of the pixel selected in the halftone image data to an output value corresponding to the dot diameter of the dot that is arranged anew. In a case where a dot is already arranged in the pixel selected in the halftone image data, a dot is not arranged anew.

(Processing Procedure in Regeneration Unit 804)

Figure 21:
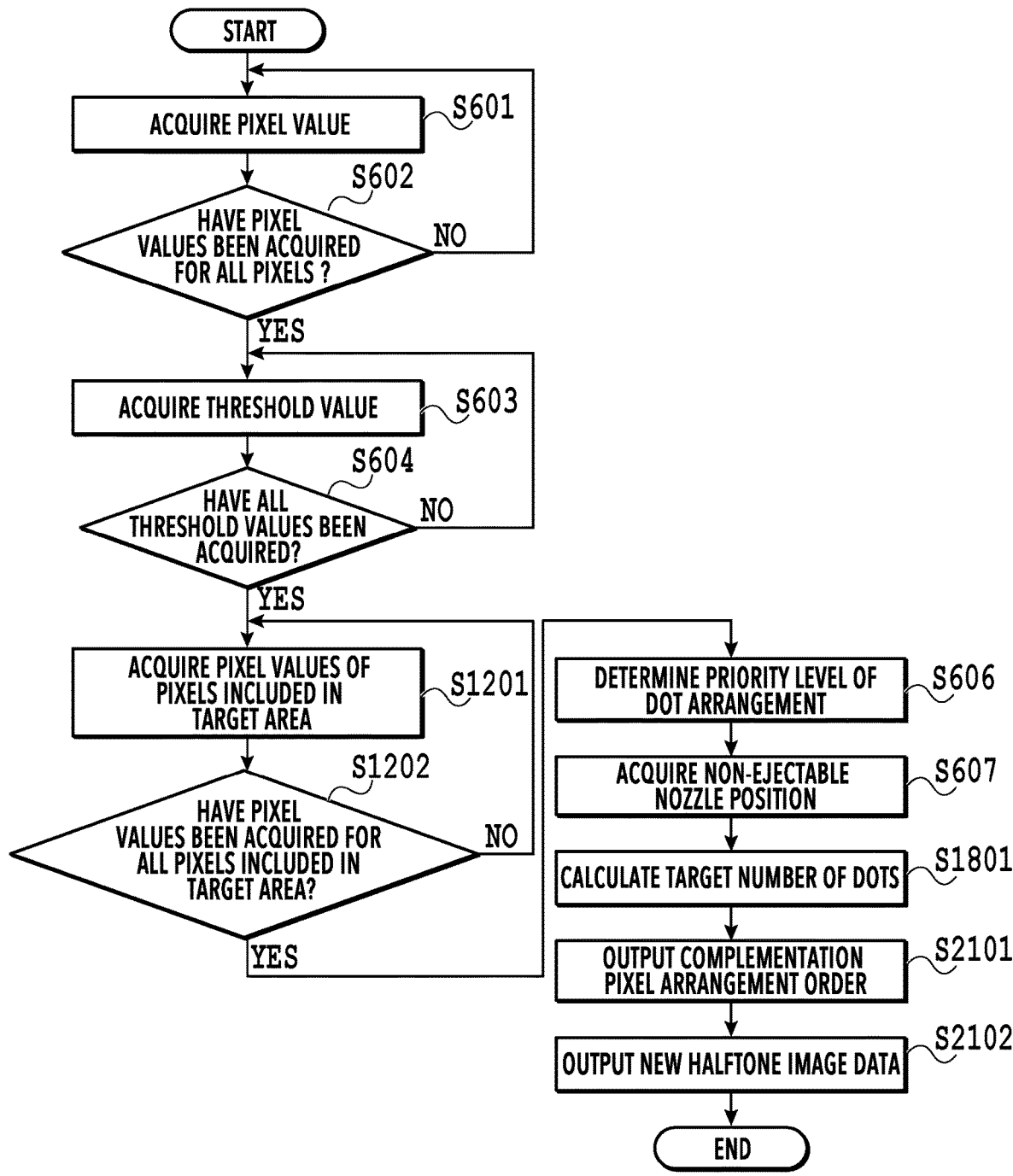
FIG. 21 is a diagram showing a procedure of processing in the regeneration unit.

FIG. 21 is a flowchart showing the procedure of the processing in the regeneration unit 804 and in this flowchart, processing at S2101 and processing at S2102 are added in place of the processing at S1802 and the processing at S1803 in the flowchart shown in FIG. 18 of the above-described fourth embodiment. Here, the processing at S2101 and the processing at S2102 added anew are explained mainly. Further, FIG. 22 shows data used in the processing shown in FIG. 21 and processing results obtained in a process of the processing.

At S2101, the complementation pixel selection unit 2001 determines and outputs the complementation pixel arrangement order based on the non-ejectable nozzle position acquired at S607 and the priority level acquired at S606. Here, by using FIG. 22, the processing to determine and output the complementation pixel arrangement order is explained. In FIG. 22, it is assumed that priority levels 2201 are priority levels determined by the priority level determination unit 204 and the non-ejectable nozzle position is the center column of the priority levels 2201.

First, the complementation pixel selection unit 2001 sequentially selects pixels having values of "197", "54", "2", and "−162" in the priority levels 2201 as the complementation center pixels. First, the complementation pixel selection unit 2001 selects the pixel having a value of "197" and compares the priority levels of two pixels adjacent to the selected pixel from left and right (that is, the pixel whose value located in the third row in the second column is "−97" and the pixel whose value located in the third row in the fourth column is "−51"). According to the comparison results, "−51" is larger than "−197" (that is, the priority level is higher), and therefore, the complementation pixel arrangement order number of the pixel whose value located in the third row in the fourth column is "−51" is determined to be "1" and the complementation pixel arrangement order number of the pixel whose value located in the third row in the second column is determined to be "2".

Next, the complementation pixel selection unit 2001 selects the pixel having a value of "54" in the priority levels 2201 and compares the priority levels of two pixels adjacent to the selected pixel from left and right similarly as described above, and then determines the complementation pixel arrangement order numbers "3" and "4". Then, the same processing is performed also in a case where the remaining complementation center pixels (that is, pixels having values of "2" and "−162") are selected. Then, after allocating the complementation pixel arrangement order number to all the pixels adjacent to the complementation center pixels, the complementation pixel selection unit 2001 allocates "0" to the pixels that have not been selected as complementation pixel candidates. The complementation pixel arrangement order output by the complementation pixel selection unit 2001 is shown as a complementation pixel arrangement order 2202 in FIG. 22.

At S2102, the dot rearrangement unit 2002 cancels the dot arranged at the non-ejectable nozzle position in the halftone image data and rearranges a dot based on the target number of dots and the complementation pixel arrangement order acquired at S2101. Here, by using FIG. 22, the processing to rearrange a dot is explained. In FIG. 22, the halftone image is shown as halftone image data 2203 and the image that is formed based on the halftone image data 2203 is shown as an image 2205. Here, the non-ejectable nozzle position is the center column of the halftone image data 2203 and the target number of dots is one large dot and one small dot.

First, the dot rearrangement unit 2002 makes an attempt to arrange a dot in the pixel indicating the first (that is, the pixel located in the third row in the fourth column) in the complementation pixel arrangement order 2202. Then, in the pixel located in the third row in the fourth column, no dot is arranged, and therefore, the dot rearrangement unit 2002 preferentially arranges a dot whose dot diameter is large in accordance with the acquired target number of dots. Here, the target number of dots is "one large dot and one small dot", and therefore, in the pixel located in the third row in the fourth column, a large dot is arranged. That is, the pixel value of the pixel located in the third row in the fourth column is updated from "0" to "3".

Following the above, the dot rearrangement unit 2002 makes an attempt to arrange a dot in the pixel indicating the second (that is, the pixel located in the third row in the second column) in the complementation pixel arrangement order 2202. No dot is arranged also in this pixel located in the third row in the second column. Because of this, the dot rearrangement unit 2002 arranges a small dot, which is the remaining dot, in accordance with the acquired target number of dots. Due to this, the pixel value of the pixel located in the third row in the second column is updated from "0" to "1". By rearranging dots in this manner, the dot rearrangement unit 2002 generates and outputs new halftone image data 2204. The image that is formed based on the halftone image data 2204 is shown as an image 2206 in FIG. 22.

As explained above, it is possible to rearrange a dot in the vicinity of the pixel in which a dot is expected to be formed by a non-ejectable nozzle. Then, the rearrangement is performed based on the priority level, and therefore, it is possible to rearrange a dot in the pixel in which a dot should be arranged more preferentially. In the present embodiment, the specifications are explained in which the complementation pixel selection unit 2001 takes the complementation center pixel as a center and selects two pixels adjacent thereto from left and right as complementation pixel candidates. However, the present embodiment is not limited to the aspect such as this and for example, it is also possible to take the complementation center pixel as a center and select also four pixels adjacent thereto in the diagonal directions as complementation pixel candidates. That is, it may also be possible to take the complementation center pixel as a center and select six pixels (adjacent six pixels) adjacent thereto from left and right and in the diagonal directions.

As regards the complementation pixel candidate, the complementation center pixel is selected in order and determined each time. Because of this, in a case where six pixels are selected as complementation pixel candidates, as regards the pixel adjacent in the diagonal direction, the pixel to which the complementation pixel arrangement order number is already allocated is selected again as the complementation pixel candidate. Consequently, in this case, to the pixel to which the complementation pixel arrangement order number is already allocated, the complementation pixel arrangement order number is not allocated anew. Due to this, the pixel whose priority level is high is selected in order from among the pixels adjacent to the complementation center pixel from left and right and in the diagonal directions, and therefore, it is possible to rearrange a dot by taking into consideration the priority level of the dot at the non-ejectable nozzle position.

In FIG. 22, the complementation pixel arrangement order that is determined in a case where six pixels are selected as complementation pixel candidates is shown as a complementation pixel arrangement order 2207. Further, the halftone image data that is output based on the complementation pixel arrangement order is shown as halftone image data 2208. As described above, by selecting six pixels adjacent from left and right and in the diagonal directions with the complementation center pixel as a center, it is possible to preferentially rearrange a dot in the pixel that is selected in the early stage as the complementation center pixel, that is, on the periphery of the pixel whose priority level is high and which is located at the non-ejectable nozzle position.

Sixth Embodiment

In the fifth embodiment, the complementation pixel arrangement order is determined and a dot is rearranged based on the complementation pixel arrangement order. However, in a case where dots are already arranged in many rearrangement-target pixels, dot rearrangement is not performed frequently. In this case, there is a possibility that the dot rearrangement processing terminates without reaching the target number of dots. Consequently, in the present embodiment, a method is explained that converts the target number of dots into the compensation value and compensates for a dot based on the dot located at the non-ejectable nozzle position.

Figure 23:
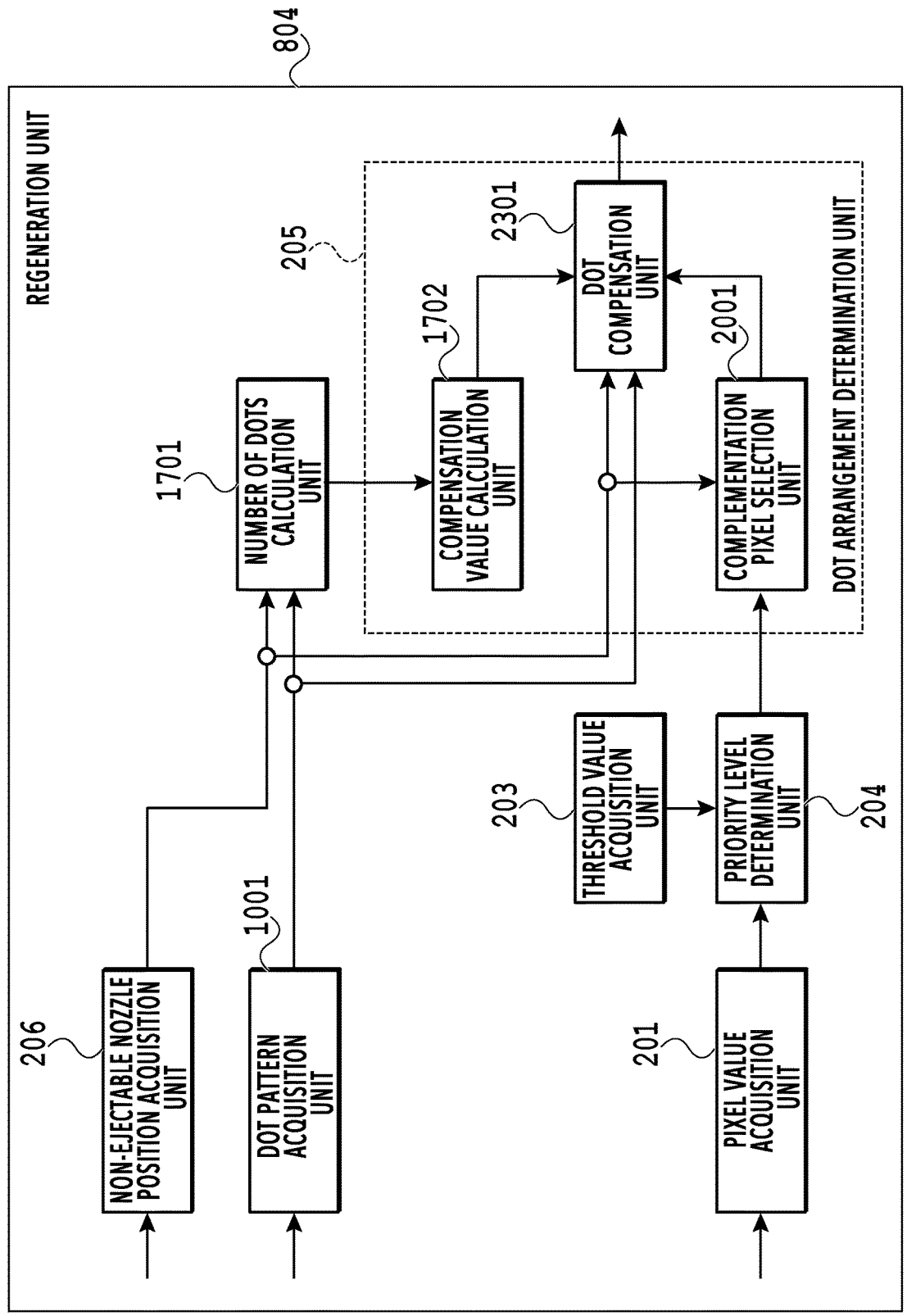
FIG. 23 is a diagram showing a function configuration of the regeneration unit.

FIG. 23 is a diagram showing the function configuration of the regeneration unit 804 of the image processing apparatus according to the present embodiment. As shown in FIG. 23, the regeneration unit 804 has the dot pattern acquisition unit 1001, the pixel value acquisition unit 201, the threshold value acquisition unit 203, the priority level determination unit 204, the dot arrangement determination unit 205, the non-ejectable nozzle position acquisition unit 206, and the number of dots calculation unit 1701. Further, the dot arrangement determination unit 205 has the compensation value calculation unit 1702, the complementation pixel selection unit 2001, and a dot compensation unit 2301. In the following, explanation of the block to which the same symbol as that of the above-described embodiment is attached is omitted and here, the dot compensation unit 2301 is explained.

(Function Configuration of Regeneration Unit 804)

The dot compensation unit 2301 cancels the dot arranged at the non-ejectable nozzle position in the halftone image data and compensates for a dot by selecting pixels one by one as the compensation-target pixel based on the complementation pixel arrangement order and the compensation value. The processing to cancel the dot arranged at the non-ejectable nozzle position and the processing to compensate for a dot are the same as the processing in the above-described fourth embodiment, and therefore, explanation thereof is omitted here.

(Processing Procedure in Regeneration Unit 804)

Figure 24:
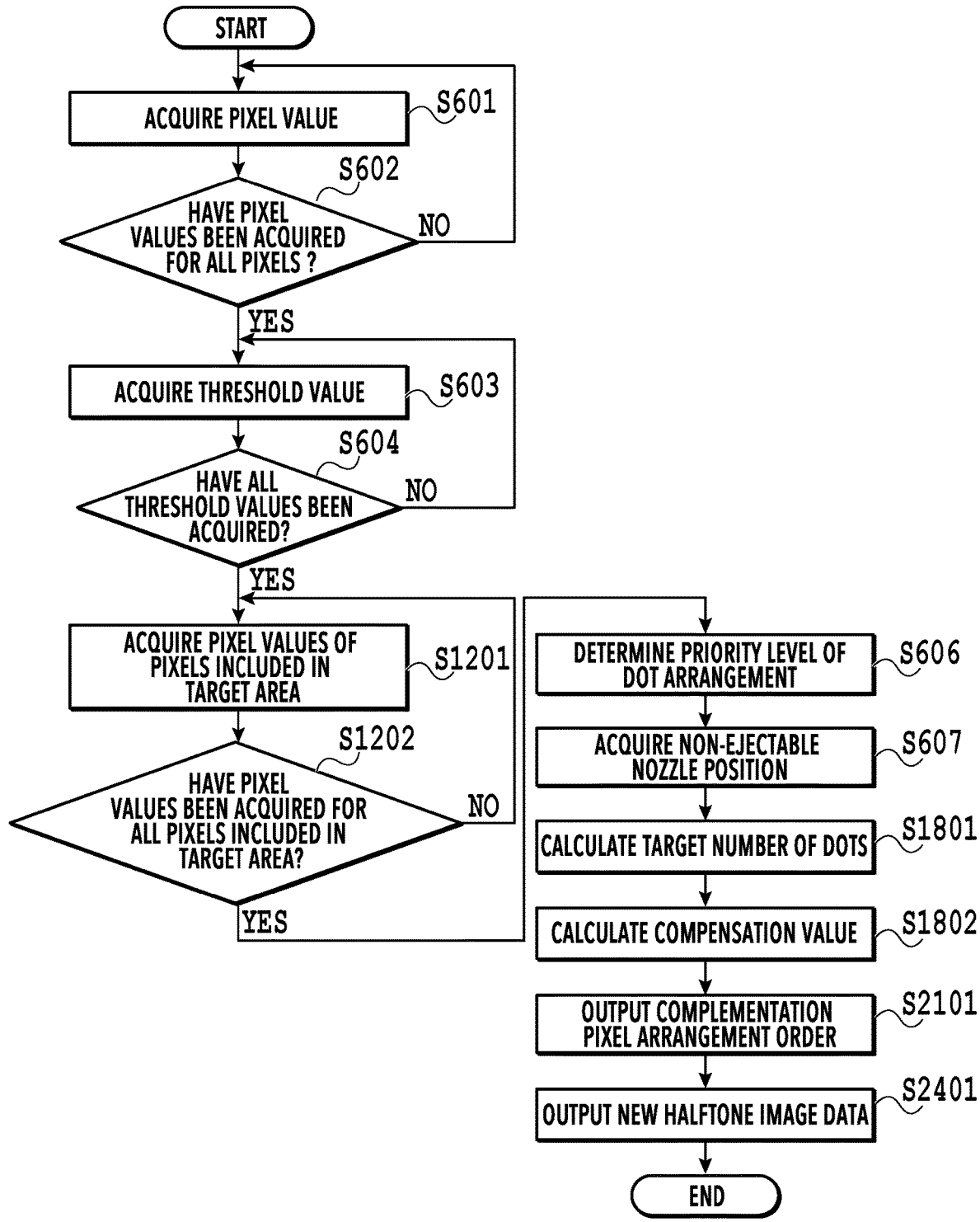
FIG. 24 is a diagram showing a procedure of processing in the regeneration unit.

FIG. 24 is a flowchart showing the procedure of processing in the regeneration unit 804 and in this flowchart, processing at S1802 and processing at S2401 are added in place of the processing to rearrange a dot at S1202 in the flowchart shown in FIG. 21 of the above-described fifth embodiment. Here, the processing at S2401 that is added anew is explained mainly. Further, FIG. 25 shows data used in the processing shown in FIG. 24 and processing results obtained in a process of the processing.

At S2401, the dot compensation unit 2301 cancels the dot arranged at the non-ejectable nozzle position in the halftone image data and compensates for a dot in the halftone image data based on the compensation value and the complementation pixel arrangement order. Here, by using FIG. 25, the processing to compensate for a dot in the halftone image data based on the compensation value and the complementation pixel arrangement order is explained.

Figure 25:
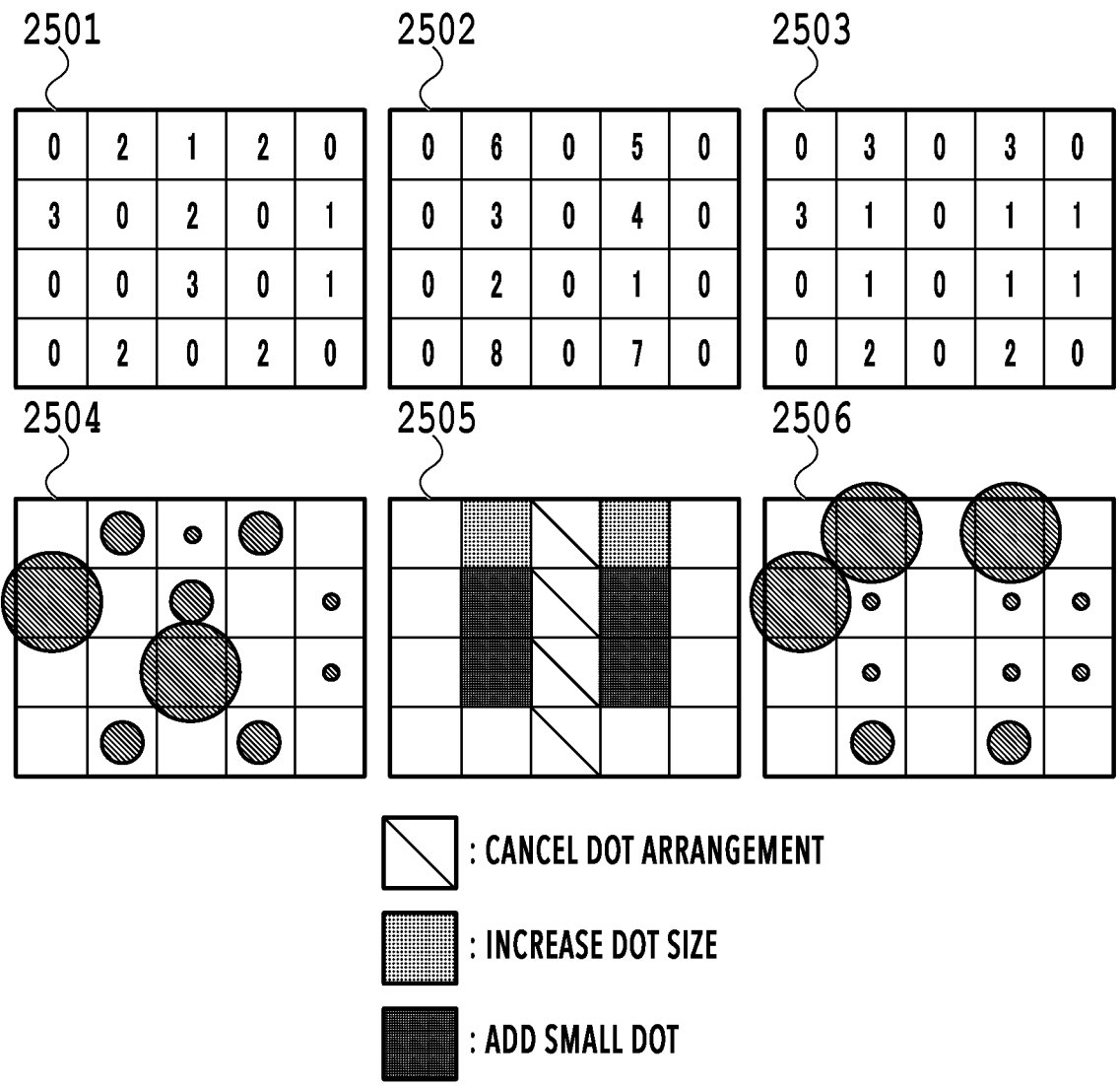
FIG. 25 is a diagram showing data used in the processing in the regeneration unit and processing results obtained in a process of the processing.

In FIG. 25, the halftone image is shown as halftone image data 2501 and the image that is formed based on the halftone image data 2501 is shown as an image 2504. Further, the non-ejectable nozzle position is the center column of the halftone image data 2501 and the compensation value is "6". Furthermore, the complementation pixel arrangement order acquired at S2101 is shown as a complementation pixel arrangement order 2502.

In this case, the dot compensation unit 2301 first cancels the dot arranged at the non-ejectable nozzle position in the halftone image data. Due to this, the pixel value of the pixel located in the center column, which is the non-ejectable nozzle position, is rewritten to "0". Next, the dot compensation unit 2301 selects the first to sixth pixels in the arrangement order of the complementation pixel arrangement order 2502 based on the compensation value as compensation-target pixels and compensates for a dot as in the above-described fourth embodiment. Due to this, the dot compensation unit 2301 generates new halftone image data 2503. In FIG. 25, what represents the image that is formed based on the halftone image data 2503 is an image 2506. Further, the contents of the non-ejection complementation performed for each pixel by the dot compensation unit 2301 are shown as an image 2505.

As explained above, even in a case where dots are arranged in many pixels in the vicinity of the pixel in which a dot is expected to be formed by a non-ejectable nozzle, it is possible to form a dot in the pixel in which a dot should be compensated for more preferentially.

In a case where the number of times dot compensation is performed is less the compensation value although a pixel is compensated for in accordance with the compensation target order from the first thorough the last, it may also be possible to perform compensation again in accordance with the compensation target order from the first through the last. In particular, in a case where there is a pixel in which a dot cannot be arranged, such as a thin line, by performing compensation in the compensation target order from the first through the last a plurality of times, it is possible to output a halftone image for which dot compensation capable of sufficiently dealing with a dot defect due to a non-ejectable nozzle has been performed while suppressing degradation of sharpness.

Seventh Embodiment

In the third embodiment, the priority level determined by the priority level determination unit 204 is corrected so that a dot that is formed by a non-ejectable nozzle becomes more likely to be rearranged in the pixel column adjacent to the non-ejectable nozzle position. In the present embodiment, a method is explained that corrects the threshold value used for the comparison with a pixel value so that a dot that is formed by a non-ejectable nozzle becomes more likely to be rearranged in the pixel column adjacent to the non-ejectable nozzle position. In the following, as in the second and third embodiments, explanation is given by taking a case as an example where dot rearrangement is performed for a dot pattern that is generated by not taking into consideration the non-ejectable nozzle position.

Figure 26:
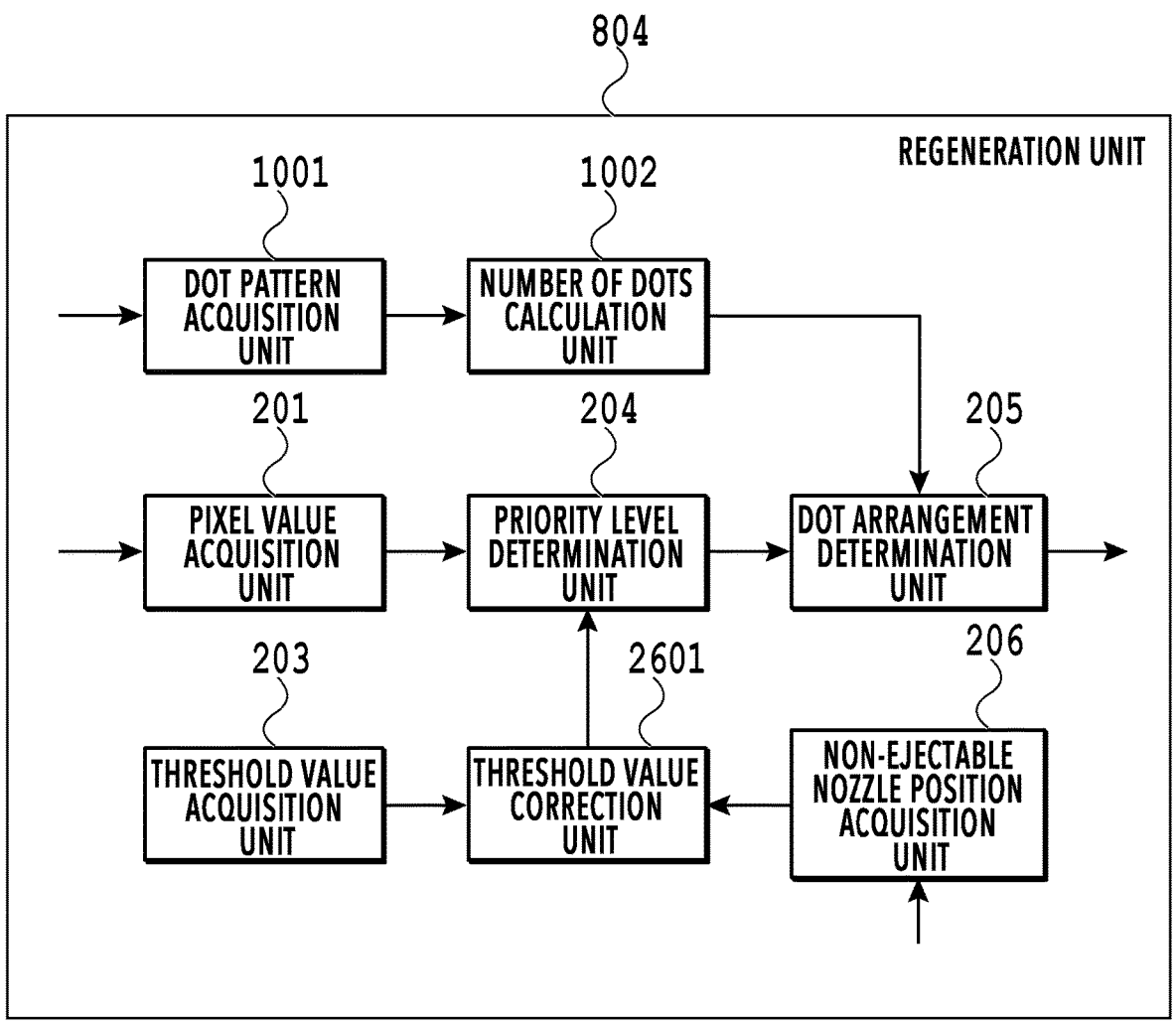
FIG. 26 is a diagram showing a function configuration of the regeneration unit.

FIG. 26 is a diagram showing the function configuration of the regeneration unit 804 of the image processing apparatus according to the present embodiment. As shown in FIG. 26, the regeneration unit 804 has the dot pattern acquisition unit 1001, the number of dots calculation unit 1002, the pixel value acquisition unit 201, the threshold value acquisition unit 203, the priority level determination unit 204, the dot arrangement determination unit 205, the non-ejectable nozzle position acquisition unit 206, and a threshold value correction unit 2601. In the following, explanation of the block to which the same symbol as that in FIG. 14 of the third embodiment is attached is omitted and here, the threshold value correction unit 2601 is explained.

(Function Configuration of Regeneration Unit 804)

The threshold value correction unit 2601 corrects the threshold value within the threshold value group (threshold value matrix) acquired by the threshold value acquisition unit 203 so that a dot that is formed by a non-ejectable nozzle becomes more likely to be rearranged in the pixel column adjacent to the non-ejectable nozzle position based on the non-ejectable nozzle position. The threshold value correction unit 2601 outputs the corrected threshold value group to the priority level determination unit 204.

(Processing Procedure in Regeneration Unit 804)

Figure 27:
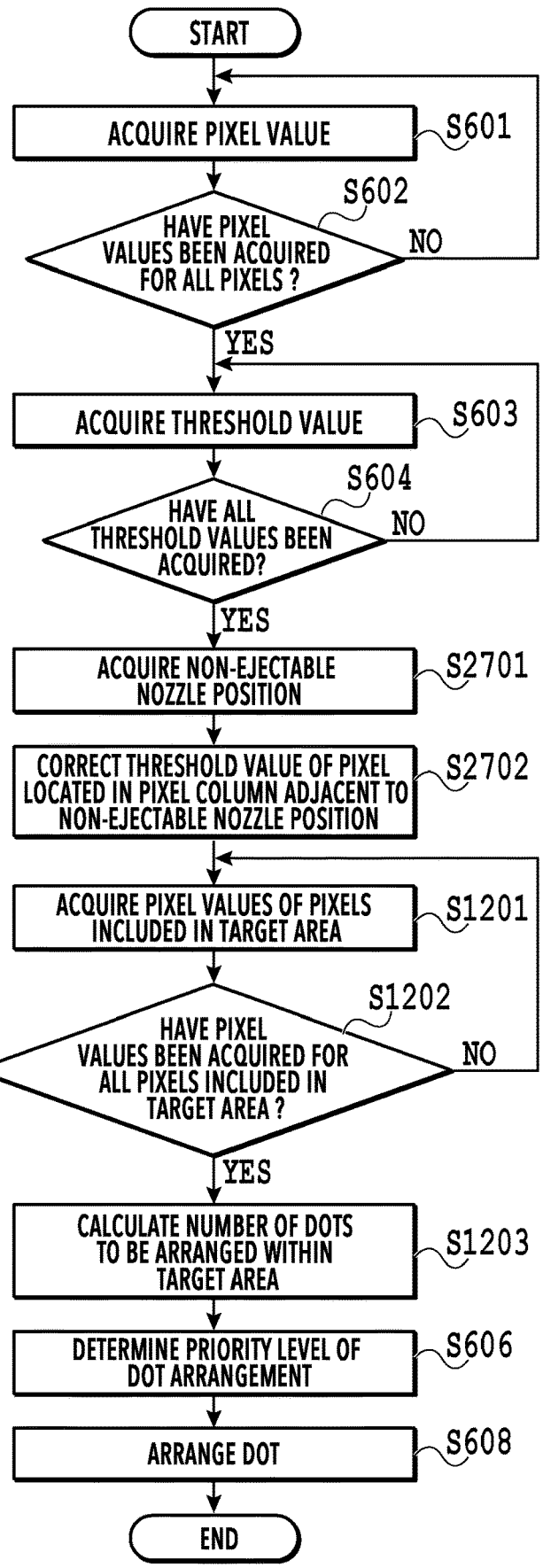
FIG. 27 is a diagram showing a procedure of processing in the regeneration unit.

FIG. 27 is a flowchart showing the procedure of processing in the regeneration unit 804. In the flowchart shown in FIG. 27, processing at S2701 and S2702 is added between the processing at S604 and the processing at S1201 in the flowchart shown in FIG. 12 of the above-described second embodiment. Then, the non-ejectable nozzle position is acquired at S2701 that is added and the contents thereof are reflected in the threshold value at S2702, and therefore the processing at S607 is no longer necessary and deleted. Here, the processing at S2702 that is added anew is explained mainly. Further, FIG. 28 shows data used in the processing shown in FIG. 27 and processing results obtained in a process of the processing.

At S2701, the non-ejectable nozzle position acquisition unit 206 acquires the non-ejectable nozzle position from the RAM 101 or the external storage device 105. Here, it is assumed that the position of the third column from the left in a threshold value group 2801 (position of "40", "232", "24", and "216") corresponding to the target area shown in FIG. 28 is the non-ejectable nozzle position.

At S2702, the threshold value correction unit 2601 corrects the threshold value group acquired at S603 and S604 based on the non-ejectable nozzle position acquired at S2701. Specifically, correction is made so that the threshold value corresponding to the pixel column adjacent to the non-ejectable nozzle position in the acquired threshold value group becomes relatively lower than the threshold value corresponding to the pixel column at the non-ejectable nozzle position. The threshold value correction unit 2601 outputs the corrected threshold value to the priority level determination unit 204.

Figure 28:
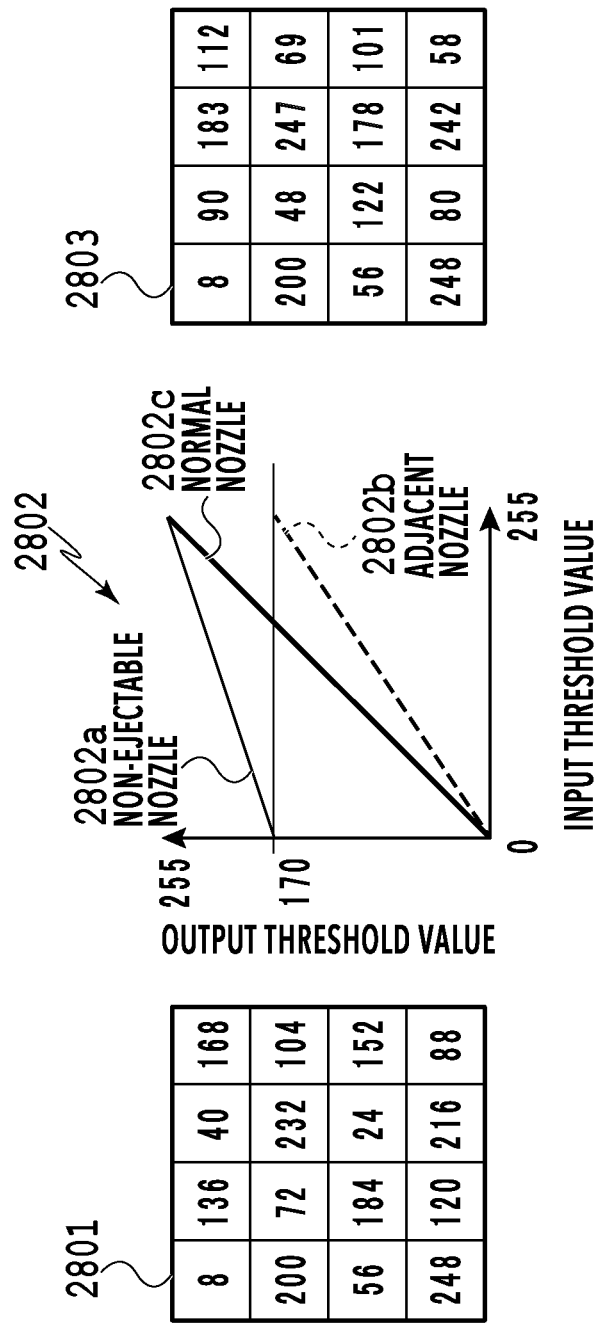
FIG. 28 is a diagram showing data used in processing in a threshold value correction unit and processing results obtained in a process of the processing.

Here, with reference to FIG. 28, how each threshold value in a threshold value group 2801 is corrected is explained. The threshold value correction unit 2601 corrects the threshold value group 2801 by using a correction table 2802 in a lookup table (LUT) format that specifies a relationship between input threshold values and output threshold values as shown in FIG. 28, which is stored in the RAM 101 or the external storage device 105. In the correction table 2802, a relationship between input threshold values corresponding to the pixel column at the non-ejectable nozzle position and output threshold values is indicated by a thin solid line 2802a and a relationship between input threshold values corresponding to the pixel column adjacent to the non-ejectable nozzle position and output threshold values is indicated by a dotted line 2802b. Further, for a comparison, a relationship between input threshold values corresponding to the pixel column at the normal nozzle position, which is not the correction target, and output threshold values is indicated by a thick solid line 2802c.

In a case where a threshold value is corrected by using the LUT having the characteristics indicated by the dotted line 2802b, a threshold value 1.5 times that in the case where the LUT having the characteristics indicated by the thick solid line 2802c is obtained as a result. That is, in a case where a priority level is generated by a difference between the input tone value of the uniform tone and the threshold value for which correction has been made, the priority level is such that the density multiplied by 1.5 is obtained in the output image. On the other hand, in a case where a threshold value is corrected by using the LUT having the characteristics indicated by the thin solid line 2802a, the tendency is opposite. That is, in a case where a priority level is generated by a difference between the input tone value of the uniform tone and the threshold value for which the correction has been made, the priority level is such that the density in the output image is lower. Symbol 2803 in FIG. 28 indicates a corrected threshold value group corrected by the threshold value correction unit 2601 and this corrected threshold value group 2803 is output to the priority level determination unit 204.

Then, after S1201 to S1203 are performed, at S606, the priority level determination unit 204 determines a priority level based on the received corrected threshold value group 2803. FIG. 29 is a diagram explaining the way the priority level determination unit 204 determines the priority level based on the corrected threshold value group 2803. The priority level determination unit 204 determines priority levels 2902 corresponding to each of 16 pixels by calculating a difference between a threshold value group 2901 of the target area and the corrected threshold value group 2803. In the pixel whose value indicating the priority level is larger (that is, pixel whose priority level is higher), a dot is arranged more preferentially. That is, at next S608, the dot arrangement determination unit 205 arranges dots in order from the first pixel indicated in an arrangement order 2903 based on the priority levels 2902 shown in FIG. 29.

As above, in the method of the present embodiment, correction is made so that the threshold value corresponding to the pixel column adjacent to the non-ejectable nozzle position becomes relatively lower than the threshold value corresponding to the pixel column at the non-ejectable nozzle position. Due to this, a dot becomes more likely to be rearranged in the pixel column adjacent to the non-ejectable nozzle position.

In the present embodiment, the threshold values corresponding to one pixel column adjacent to the non-ejectable nozzle position are made small, but the present embodiment is not limited to this. It may also be possible to design a correction table so that a reduction in amount becomes less in accordance with the distance from the non-ejectable nozzle position (as becoming more distant from the non-ejectable nozzle position) also for the threshold values corresponding to the pixel column two or more pixel columns apart from the non-ejectable nozzle position.

Further, it may also be possible to store in advance corrected threshold values for which threshold value correction processing has been performed in the RAM 101 or the external storage apparatus 105 and for the priority level determination unit 204 to determine a priority level by reading each time the corrected threshold value corresponding to the target area. In this case, it is no longer necessary for the threshold value correction unit 2601 to repeat the threshold value correction processing for each input image.

Figure 30:
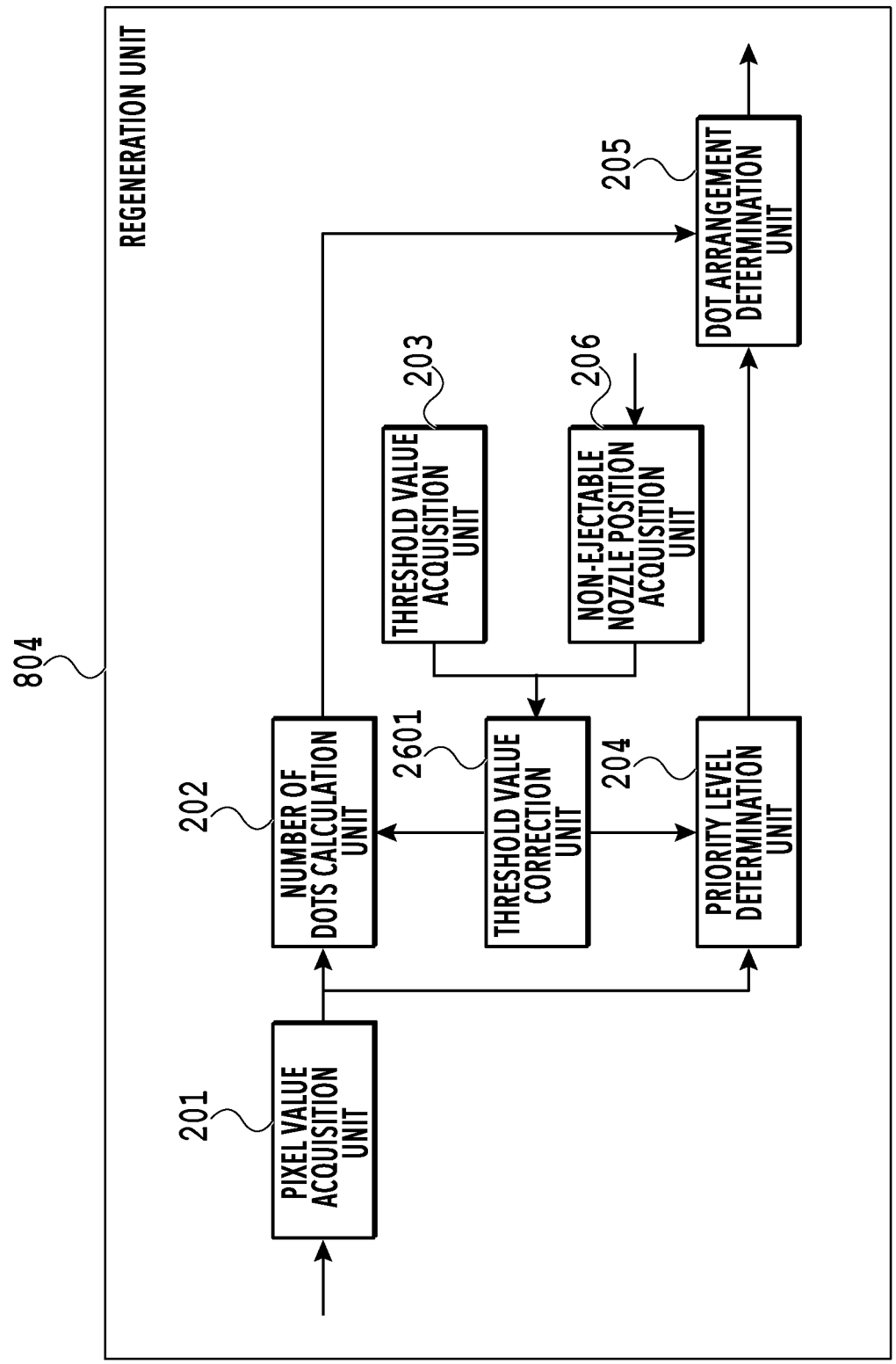
FIG. 30 is a diagram showing a function configuration of the regeneration unit.

Further, it is possible to apply the method of correcting a threshold value within a threshold value matrix described in the present embodiment to a method of arranging a dot by taking into consideration the non-ejectable nozzle position at the time of generation of halftone image data. That is, it may also be possible to configure the image processing unit 106 as shown in FIG. 30 in place of the configuration shown in FIG. 2. Each block in FIG. 30 is the same function as that of each block used in FIG. 2 of the first embodiment and FIG. 26 of the present embodiment, and therefore, explanation is omitted. In a case where the image processing unit 106 is configured as shown in FIG. 30, as the threshold value used in the number of dots calculation unit 202, the corrected threshold value corrected by the threshold value correction unit 2601 is used as a result. Due to this, the number of dots that takes into consideration the influence of a non-ejectable nozzle is calculated, and therefore, it is made possible to obtain the same results as those of the first embodiment without taking into consideration the influence of a non-ejectable nozzle at the time of dot arrangement in the dot arrangement determination unit 205.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to improve reproducibility of input image data while suppressing unnatural density unevenness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-015879 filed Jan. 31, 2019 and No. 2019-214292 filed Nov. 27, 2019, which are hereby incorporated by reference wherein in their entirety.

What is claimed is:

1. An image processing apparatus that processes image data for forming an image by ejection of ink from a plurality of nozzles, the image processing apparatus comprising:
    a pixel value acquisition unit configured to acquire a pixel value group including pixel values of a plurality of pixels included in a target area in an image indicated by the image data;
    a threshold value acquisition unit configured to acquire a threshold value group including a plurality of threshold values corresponding to the plurality of pixels;
    a derivation unit configured to derive a target number of dots indicating a number of dots to be arranged in the target area;
    a priority level determination unit configured to determine a priority level indicating a level of preferentially arranging a dot for each pixel position based on the pixel value group and the threshold value group;
    a position acquisition unit configured to acquire a pixel position at which a dot is expected to be formed by a non-ejectable nozzle in the image as a non-ejectable nozzle position; and
    a dot arrangement determination unit configured to determine arrangement of dots in the target area based on the priority level, the target number of dots, and the non-ejectable nozzle position.

2. The image processing apparatus according to claim 1, wherein
    the image is multi-valued image before halftone processing is performed and
    the derivation unit derives the target number of dots based on a pixel value group including pixel values of a plurality of pixels included in a target area of the multi-valued image and a threshold value group including a plurality of threshold values corresponding to the plurality of pixels.

3. The image processing apparatus according to claim 1, wherein
    the image data is dot arrangement data after halftone processing is performed and
    the derivation unit derives the target number of dots based on the dot arrangement data.

4. The image processing apparatus according to claim 3, wherein
    the derivation unit derives, in a case where there is a plurality of kinds of dot diameter for dots that are arranged in the dot arrangement data, a target number of dots classified for each dot diameter by counting a number of dots for each dot diameter.

5. The image processing apparatus according to claim 4, wherein
    the derivation unit derives the target number of dots based on a dot expected to be formed by a non-ejectable nozzle.

6. The image processing apparatus according to claim 5, wherein
    the dot arrangement determination unit has:
        a compensation value calculation unit configured to find a total sum of output values from an output value allocated for each dot diameter and a target number of dots for each dot diameter and take an acquired total sum as a compensation value; and a dot compensation unit configured to change an output value of each pixel in the target area of the dot arrangement data based on the priority level, the compensation value, and the non-ejectable nozzle position.

7. The image processing apparatus according to claim 6, wherein the dot compensation unit:

cancels an output value of a pixel located at the non-ejectable nozzle position in the target area of the dot arrangement data;

selects a pixel of interest in the dot arrangement data in accordance with the priority level; and repeatedly performs processing to increase an output value of the selected pixel by one a number of times corresponding to the compensation value.

8. The image processing apparatus according to claim 7, wherein the processing to increase an output value of the selected pixel by one is processing to increase a dot diameter of a dot by one level in a case where the dot is already arranged in the selected pixel and to arrange a dot having the smallest diameter anew in a case where no dot is arranged in the selected pixel.

9. The image processing apparatus according to claim 6, wherein the dot arrangement determination unit has a complementation pixel selection unit configured to select a plurality of complementation pixels, which are candidates of pixels in which a dot is rearranged, based on the non-ejectable nozzle position and the priority level and determine an arrangement order of rearranging dots in the selected plurality of complementation pixels.

10. The image processing apparatus according to claim 9, wherein the complementation pixel selection unit:

focuses attention on a pixel in order of the pixel priority level as a complementation center pixel, which is located at the non-ejectable nozzle position; and selects two pixels and allocates the arrangement order number thereto, which are formed by nozzles different from a nozzle that forms a dot in the complementation center pixel of interest and adjacent to the complementation center pixel from left and right with the complementation center pixel as a reference.

11. The image processing apparatus according to claim 9, wherein the complementation pixel selection unit:

focuses attention on a pixel in order of the pixel priority level as a complementation center pixel, which is located at the non-ejectable nozzle position; and selects six pixels and allocates the arrangement order number thereto, which are formed by nozzles different from a nozzle that forms a dot in the complementation center pixel of interest and adjacent to the complementation center pixel from left and right and in diagonal directions with the complementation center pixel as a reference.

12. The image processing apparatus according to claim 9, wherein the dot arrangement determination unit:

cancels an output value of a pixel located at the non-ejectable nozzle position in the target area of the dot arrangement data; and arranges dots corresponding to the target number of dots in the complementation pixels in accordance with the arrangement order determined by the complementation pixel determination unit.

13. The image processing apparatus according to claim 9, wherein the dot arrangement determination unit cancels an output value of a pixel located at the non-ejectable nozzle position in the target area of the dot arrangement data;

selects the complementation pixel in accordance with the arrangement order determined by the complementation pixel determination unit; and repeatedly performs processing to increase the output value of the selected pixel by one a number of times corresponding to the compensation value.

14. The image processing apparatus according to claim 13, wherein the processing to increase an output value of the selected pixel by one is processing to increase a dot diameter of a dot by one level in a case where the dot is already arranged in the selected pixel and to arrange a dot having the minimum diameter anew in a case where no dot is arranged in the selected pixel.

15. The image processing apparatus according to claim 3, wherein the target area is set as an area having a width of a plurality of pixels with the non-ejectable nozzle position as a center.

16. The image processing apparatus according to claim 3, wherein the dot arrangement determination unit determines dot arrangement in the target area by allocating dots corresponding to the target number of dots to each pixel not located at the non-ejectable nozzle position in accordance with the priority level in the target area.

17. The image processing apparatus according to claim 3, further comprising:

a priority level correction unit configured to correct the determined priority level so that the shorter a distance from the non-ejectable nozzle position is, the higher the priority level is.

18. The image processing apparatus according to claim 1, further comprising:

a threshold value correction unit configured to correct a threshold value corresponding to a pixel column adjacent to a non-ejectable nozzle position in a threshold value group acquired by the threshold value acquisition unit so as to become relatively lower than a threshold value corresponding to a pixel column at the non-ejectable nozzle position so that a dot that is formed by the non-ejectable nozzle becomes more likely to be arranged in the pixel column adjacent to the non-ejectable nozzle position, wherein the dot arrangement determination unit determines arrangement of dots in the target area based on the target number of dots, the non-ejectable nozzle position, the pixel value group, and a priority level determined based on a threshold value group after being corrected by the threshold value correction unit.

19. The image processing apparatus according to claim 1, further comprising:

a threshold value correction unit configured to correct a threshold value corresponding to a pixel column adjacent to a non-ejectable nozzle position in a threshold value group acquired by the threshold value acquisition unit so as to become relatively lower than a threshold value corresponding to a pixel column at the non-ejectable nozzle position so that a dot that is formed by the non-ejectable nozzle becomes more likely to be arranged in the pixel column adjacent to the non-ejectable nozzle position, wherein the target number of dot derivation unit derives the target number of dots based on a pixel value group including pixel values of a plurality of pixels included in the target area and a threshold value group after being corrected by the threshold value correction unit.

20. An image processing method of processing image data for forming an image by ejection of ink from a plurality of nozzles, the image processing method comprising:

acquiring a pixel value group including pixel values of a plurality of pixels included in a target area in an image indicated by the image data;

acquiring a threshold value group including a plurality of threshold values corresponding to the plurality of pixels;

deriving a target number of dots indicating a number of dots to be arranged in the target area;

determining a priority level indicating a level of preferentially arranging a dot for each pixel position based on the pixel value group and the threshold value group;

acquiring a pixel position at which a dot is expected to be formed by a non-ejectable nozzle in the image as a non-ejectable nozzle position; and determining arrangement of dots in the target area based on the priority level, the target number of dots, and the non-ejectable nozzle position.

21. A non-transitory computer readable storage medium storing a program for causing a computer to perform an image processing method of processing image data for forming an image by ejection of ink from a plurality of nozzles, the image processing method comprising:

acquiring a pixel value group including pixel values of a plurality of pixels included in a target area in an image indicated by the image data;

acquiring a threshold value group including a plurality of threshold values corresponding to the plurality of pixels;

deriving a target number of dots indicating a number of dots to be arranged in the target area;

determining a priority level indicating a level of preferentially arranging a dot for each pixel position based on the pixel value group and the threshold value group;

acquiring a pixel position at which a dot is expected to be formed by a non-ejectable nozzle in the image as a non-ejectable nozzle position; and determining arrangement of dots in the target area based on the priority level, the target number of dots, and the non-ejectable nozzle position.

* * * * *